US012771931B2

(12) United States Patent
Baldwin et al.

(10) Patent No.: US 12,771,931 B2
(45) Date of Patent: Oct. 20, 2026

(54) ASSIST FOR ORIENTING A CAMERA AT DIFFERENT ZOOM LEVELS

(71) Applicant: QUALCOMM Incorporated, San Diego, CA (US)

(72) Inventors: Cullum Baldwin, San Diego, CA (US); Pasi Parkkila, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/355,640

(22) Filed: Jul. 20, 2023

(65) Prior Publication Data

US 2023/0362482 A1 Nov. 9, 2023

Related U.S. Application Data

(63) Continuation of application No. 17/807,972, filed on Jun. 21, 2022, now Pat. No. 11,750,918, which is a (Continued)

(51) Int. Cl.
*H04N 23/60* (2023.01)
*H04N 5/77* (2006.01)

(Continued)

(52) U.S. Cl.
CPC ............ *H04N 23/64* (2023.01); *H04N 5/772* (2013.01); *H04N 23/45* (2023.01); *H04N 23/62* (2023.01);

(Continued)

(58) Field of Classification Search
CPC ........ H04N 23/64; H04N 5/772; H04N 23/45; H04N 23/62; H04N 23/63; H04N 23/632;

(Continued)

(56) References Cited

U.S. PATENT DOCUMENTS 7,305,180 B2 12/2007 Labaziewicz et al.
7,684,687 B2 3/2010 Furuya (Continued)

FOREIGN PATENT DOCUMENTS

CN 101646095 A 2/2010
CN 104112267 A 10/2014

(Continued)

OTHER PUBLICATIONS

Taiwan Search Report—TW112114453—TIPO—Sep. 28, 2023.

(Continued)

*Primary Examiner* — Yogesh K Aggarwal
(74) *Attorney, Agent, or Firm* — Shumaker & Sieffert, P.A.

(57) ABSTRACT

Aspects of the present disclosure relate to systems and methods for assisting in positioning a camera at different zoom levels. An example device may include a memory configured to store image data. The example device may further include a processor in communication with the memory, the processor being configured to process a first image stream associated with a scene, independently process a second image stream associated with a spatial portion of the scene wherein the second image stream is different from the first image stream, output the processed first image stream, and output during output of the processed first image stream a visual indication that indicates the spatial portion associated with the second image stream.

15 Claims, 23 Drawing Sheets

Related U.S. Application Data continuation of application No. 16/851,306, filed on Apr. 17, 2020, now Pat. No. 11,394,876, which is a continuation of application No. 15/701,293, filed on Sep. 11, 2017, now Pat. No. 10,630,895.

(51) Int. Cl.

| | |
|---|---|
| ***H04N 23/45*** | (2023.01) |
| ***H04N 23/62*** | (2023.01) |
| ***H04N 23/63*** | (2023.01) |
| ***H04N 23/69*** | (2023.01) |
| *H04N 21/431* | (2011.01) |
| *H04N 21/47* | (2011.01) |

(52) U.S. Cl.

CPC ........... *H04N 23/63* (2023.01); *H04N 23/632* (2023.01); *H04N 23/635* (2023.01); *H04N 23/69* (2023.01); *H04N 21/4316* (2013.01); *H04N 21/47* (2013.01)

(58) Field of Classification Search

CPC .. H04N 23/635; H04N 23/69; H04N 21/4316; H04N 21/47

See application file for complete search history.

(56) References Cited

U.S. PATENT DOCUMENTS

| | | | | |
|---|---|---|---|---|
| 8,159,572 | B2 | 4/2012 | Kondo | |
| 9,672,627 | B1 | 6/2017 | Ramaswamy | |
| 9,736,381 | B2 | 8/2017 | Koti et al. | |
| 10,194,089 | B2 | 1/2019 | Nash et al. | |
| 10,291,833 | B2 | 5/2019 | Kim et al. | |
| 10,475,185 | B1 * | 11/2019 | Raghavan ............ | G06Q 10/087 |
| 10,630,895 | B2 | 4/2020 | Baldwin et al. | |
| 11,394,876 | B2 | 7/2022 | Baldwin | |
| 11,490,017 | B2 | 11/2022 | Bernstein et al. | |
| 11,750,918 | B2 | 9/2023 | Baldwin et al. | |
| 2004/0218079 | A1 | 11/2004 | Stavely et al. | |
| 2004/0250216 | A1 | 12/2004 | Roman et al. | |
| 2007/0025723 | A1 | 2/2007 | Baudisch et al. | |
| 2008/0109729 | A1 | 5/2008 | Notea et al. | |
| 2010/0141767 | A1 | 6/2010 | Mohanty et al. | |
| 2010/0321536 | A1 | 12/2010 | Lee et al. | |
| 2011/0050963 | A1 | 3/2011 | Watabe | |
| 2011/0283223 | A1 | 11/2011 | Vaittinen et al. | |
| 2012/0268641 | A1 | 10/2012 | Kazama | |
| 2014/0049659 | A1 * | 2/2014 | Gong ................... | H04N 23/661 348/E5.043 |
| 2015/0085105 | A1 * | 3/2015 | Maynard .............. | H04N 23/698 348/135 |
| 2015/0350554 | A1 * | 12/2015 | Koti ..................... | H04N 23/611 345/173 |
| 2016/0007008 | A1 | 1/2016 | Molgaard et al. | |
| 2016/0044235 | A1 | 2/2016 | Cho et al. | |
| 2016/0050351 | A1 * | 2/2016 | Lee ........................ | H04N 23/55 348/221.1 |
| 2016/0212358 | A1 * | 7/2016 | Shikata ................ | H04N 13/286 |
| 2016/0255268 | A1 | 9/2016 | Kang et al. | |
| 2016/0316147 | A1 * | 10/2016 | Bernstein ............... | H04N 23/69 |
| 2016/0381289 | A1 | 12/2016 | Kim et al. | |
| 2017/0026582 | A1 | 1/2017 | Kim et al. | |
| 2017/0070670 | A1 | 3/2017 | Kwon et al. | |
| 2017/0094184 | A1 | 3/2017 | Gao et al. | |
| 2017/0347035 | A1 | 11/2017 | Kim et al. | |
| 2017/0359505 | A1 | 12/2017 | Manzari et al. | |
| 2018/0131876 | A1 | 5/2018 | Bernstein et al. | |
| 2018/0321826 | A1 | 11/2018 | Bereza et al. | |
| 2025/0184601 | A1 | 6/2025 | Baldwin et al. | |

FOREIGN PATENT DOCUMENTS

| | | | |
|---|---|---|---|
| CN | 104364712 | A | 2/2015 |
| CN | 105245771 | A | 1/2016 |
| CN | 106375637 | A | 2/2017 |
| CN | 106713772 | A | 5/2017 |
| EP | 2267994 | A1 | 12/2010 |
| EP | 2781081 | A1 | 9/2014 |
| EP | 3122021 | A2 | 1/2017 |
| EP | 3346694 | A1 | 7/2018 |
| EP | 3506617 | A1 | 7/2019 |
| JP | H0895114 | A | 4/1996 |
| KR | 20090062577 | A | 6/2009 |
| KR | 101024705 | B1 | 3/2011 |
| WO | 2013073107 | A1 | 5/2013 |
| WO | 2016172619 | A1 | 10/2016 |
| WO | 2017068456 | A1 | 4/2017 |
| WO | WO-2018052159 | A1 | 3/2018 |

OTHER PUBLICATIONS

International Search Report and Written Opinion—PCT/US2018/050205—ISA/EPO—Apr. 2, 2019.

Prosecution History for U.S. Appl. No. 15/701,293 dated from Jun. 14, 2018 through Mar. 23, 2020, 99 pages.

Prosecution History for U.S. Appl. No. 16/851,306 dated from Mar. 17, 2021 through May 12, 2022, 57 pages.

Taiwan Search Report—TW107131762—TIPO—Jan. 2, 2022.

European Search Report EP25170184 Search Authority the Hague Sep. 29, 2025.

Taiwan Search Report TW113115586 TIPO Sep. 28, 2025.

* cited by examiner

ASSIST FOR ORIENTING A CAMERA AT DIFFERENT ZOOM LEVELS

CLAIM OF PRIORITY UNDER 35 U.S.C. § 120

The present Application for Patent is a continuation of U.S. patent application Ser. No. 17/807,972 entitled, "ASSIST FOR ORIENTING A CAMERA AT DIFFERENT ZOOM LEVELS" filed Jun. 21, 2022, which is a continuation of U.S. patent application Ser. No. 16/851,306 entitled, "ASSIST FOR ORIENTING A CAMERA AT DIFFERENT ZOOM LEVELS" filed Apr. 17, 2020, which is a continuation of patent application Ser. No. 15/701,293 entitled, "ASSIST FOR ORIENTING A CAMERA AT DIFFERENT ZOOM LEVELS" filed Sep. 11, 2017, and assigned to the assignee hereof and hereby expressly incorporated by reference herein.

TECHNICAL FIELD

This disclosure relates generally to systems for image capture devices, and specifically to positioning a camera for recording images or video.

BACKGROUND OF RELATED ART

Many devices and systems (such as smartphones, tablets, digital cameras, security systems, computers, and so on) include cameras for various applications. For many camera systems, when taking images or recording video, a display for the camera (such as a smartphone or tablet display) previews images or video being captured by the camera. For example, if a camera zooms in while taking pictures or recording video, the display shows the zoomed in view (which is what is being recorded using the camera).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to assisting in positioning a camera at different zoom levels. In some implementations, an example device may include a memory configured to store image data. The example device may further include a processor in communication with the memory, the processor being configured to: process a first image stream associated with a scene; independently process a second image stream associated with a spatial portion of the scene, wherein the second image stream is different from the first image stream; output the processed first image stream; and output, during output of the processed first image stream, a visual indication that indicates the spatial portion associated with the second image stream.

In another example, a method is disclosed. The example method includes processing, by a processor, a first image stream associated with a scene; independently processing, by the processor, a second image stream associated with a spatial portion of the scene, wherein the second image stream is different from the first image stream; outputting the processed first image stream; and outputting, during the output of the processed first image stream, a visual indication that indicates the spatial portion associated with the second image stream.

In another example, a non-transitory computer-readable medium is disclosed. The non-transitory computer-readable medium may store instructions that, when executed by a processor, cause a device to perform operations including processing, by a processor, a first image stream associated with a scene; independently processing, by the processor, a second image stream associated with a spatial portion of the scene, wherein the second image stream is different from the first image stream; outputting the processed first image stream; and outputting, during the output of the processed first image stream, a visual indication that indicates the spatial portion associated with the second image stream.

In another example, a device is disclosed. The device includes means for processing a first image stream associated with a scene; means for independently processing a second image stream associated with a spatial portion of the scene, wherein the second image stream is different from the first image stream; means for outputting the processed first image stream; and means for outputting, during the output of the processed first image stream, a visual indication that indicates the spatial portion associated with the second image stream.

BRIEF DESCRIPTION OF THE DRAWINGS

Aspects of this disclosure are illustrated by way of example, and not by way of limitation, in the figures of the accompanying drawings and in which like reference numerals refer to similar elements.

DETAILED DESCRIPTION

Figure 1A:
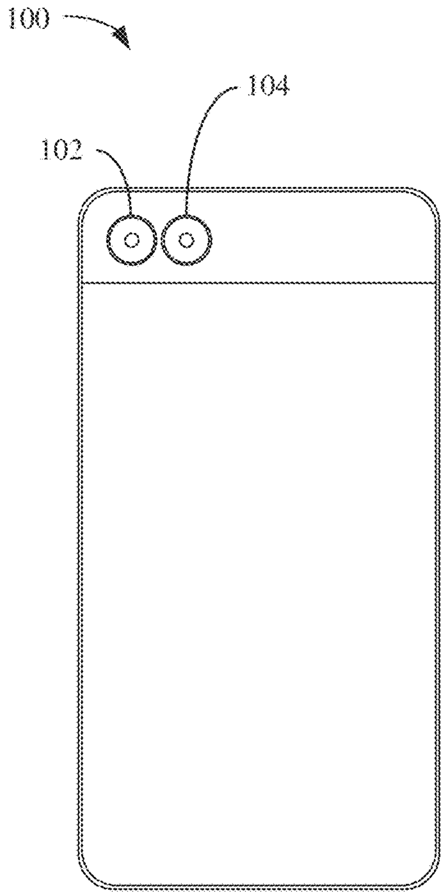
FIG. 1A depicts an example device including multiple cameras.

Aspects of the present disclosure may assist a user in positioning a camera for recording images or video, and may be applicable to devices having a variety of camera configurations.

Each camera includes a field of view for capturing a scene. Many people use a zoom ("zoom in") to capture only a portion of the scene in the field of view. The zoom may be optical, and the camera lenses are moved to change the focal length of the camera (allowing an object in the scene to be magnified without loss of resolution). The zoom alternatively may be digital, and portions of a captured scene are cropped. If portions of the captured scene are cropped, the remaining portion may be stretched on a display (causing some loss in resolution).

In a zoomed in view, camera movements (such as panning or tilting a camera, or a user moving the smartphone or tablet during recording) are amplified (since the object in the view may be magnified or stretched), resulting in the previewed imagery or video (and therefore the recorded imagery or video) not including or being centered on the object or scene intended to be recorded by the user. For example, if a device is recording images or video from a soccer game, and the user commands the camera to zoom in on a specific player or the ball, the player or ball may not remain centered (or even present) in the camera's field of view while zoomed in. A user may struggle to position the camera, for example, by attempting to find the player or ball in the zoomed in preview of the camera display. It is desirable to assist the user in positioning the camera, for example, to reduce user difficulties in positioning the camera during a zoomed view.

In some implementations, at least a portion of a device (such as one or more processors) may process a first image stream (from a first camera) associated with a scene, independently process a second image stream (from a second camera) associated with a spatial portion of the scene different from the first image stream, output the processed first image stream (such as to preview via a display), and output a visual indication of the spatial portion of the scene associated with the second image stream during output of the processed first image stream (such as on the preview of the processed first image stream). In this manner, aspects of the present disclosure may prevent a user from struggling to position a camera at different zoom levels while capturing and/or recording images or video, and also may allow a device to more effectively capture and/or record intended portions of a scene. For example, as noted above, a user recording a soccer game may use the visual indication in a preview to identify what portion of the scene is being recorded and thus position the camera as desired without searching in a zoomed in view for the preview.

The terms "capture" and "record" are used to differentiate between images from a camera sensor before being processed or not fully processed (such as for a preview) and images that are fully processed (such as for placing in storage for later viewing or for streaming to others). When a camera sensor is active, the camera may continually (such as at a predetermined number of frames per second) "capture" images. Many of these images are discarded and not used or fully processed (such as applying denoising, edge enhancement, color balance, and other filters by an image signal processor). "Recorded" images or video are captures that the user intends or requests to be fully processed by an image signal processor (such as by pressing a camera button for an image, pressing a record button for video, and so on). A camera preview shows captures without being fully processed. If the camera preview shows captures that are also being recorded, the preview shows partially processed captures while the image signal processor fully processes the captures. If the camera preview shows captures before an image or video is to be recorded, the preview shows partially processed captures that are discarded after preview. Once captures are fully processed for recording, the resulting images or video may be, e.g., stored in memory for later viewing, streamed to others for live viewing, and so on.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable processor (such as an image signal processor) or device (such as smartphones, tablets, laptop computers, digital cameras, web cameras, and so on) that include one or more cameras, and may be implemented for a variety of camera configurations. While portions of the below description and examples use two cameras for a device in order to describe aspects of the disclosure, the disclosure applies to any device with at least one camera. For devices with multiple cameras, the cameras may have similar or different capabilities (such as resolution, color or black and white, a wide view lens versus a telephoto lens, zoom capabilities, and so on).

Figure 1B:
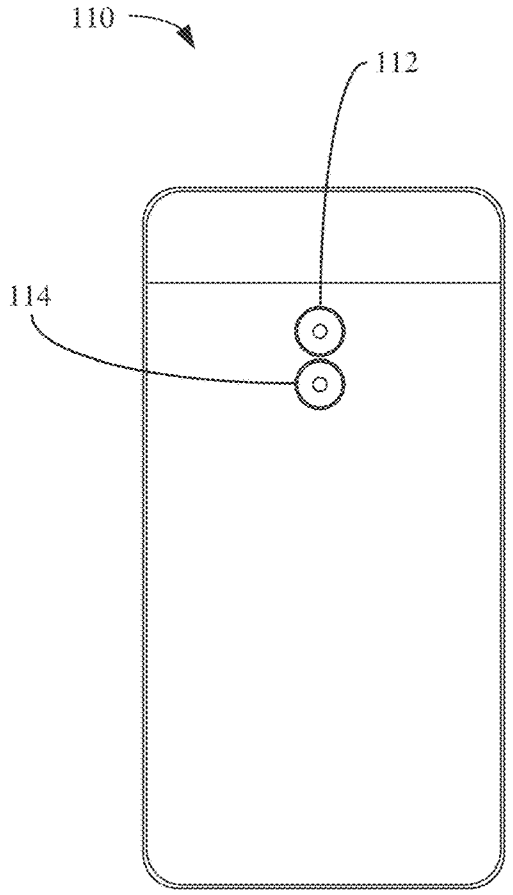
FIG. 1B depicts another example device including multiple cameras.

FIG. 1A depicts an example device 100 including a dual camera with a first camera 102 and a second camera 104 arranged in a first configuration. FIG. 1B depicts another example device 110 including a dual camera with a first camera 112 and a second camera 114 arranged in a second configuration. In some aspects, one of the cameras (such as the first cameras 102 and 112) may be a primary camera, and the other camera (such as the second cameras 104 and 114) may be an auxiliary camera. Additionally or alternatively, the second cameras 104 and 114 may have a different focal length, capture rate, resolution, color palette (such as color versus black and white), and/or field of view or capture than the first cameras 102 and 112. In some aspects, the first cameras 102 and 112 each may include a wide field of view and the second cameras 104 and 114 each may include a narrower field of view (such as a telephoto camera). In other aspects, the first cameras 102 and 112 may have the same capabilities as the second cameras 104 and 114 yet not have the same vantage of a scene to be captured or recorded.

While an example device that may be a smartphone or tablet including a dual camera is depicted, aspects of the present embodiments may be implemented in any device with an image signal processor. Another example device is a wearable (such as smartwatches) which may connect to a smartphone or tablet. A further example device is an augmented or virtual reality headset coupled (e.g., in communication with or physically connected to) to cameras. Another example device is a drone or automobile coupled to or including cameras. A further example device is a video security system coupled to security cameras. The examples are for illustrative purposes only, and the disclosure should not be limited to any specific example or device.

The term "device" is not limited to one or a specific number of physical objects (such as one smartphone). As used herein, a device may be any electronic with multiple parts that may implement at least some portions of this disclosure. While the below description and examples use the term "device" to describe various aspects of this disclosure, the term "device" is not limited to a specific configuration, type, or number of objects.

Figure 2A:
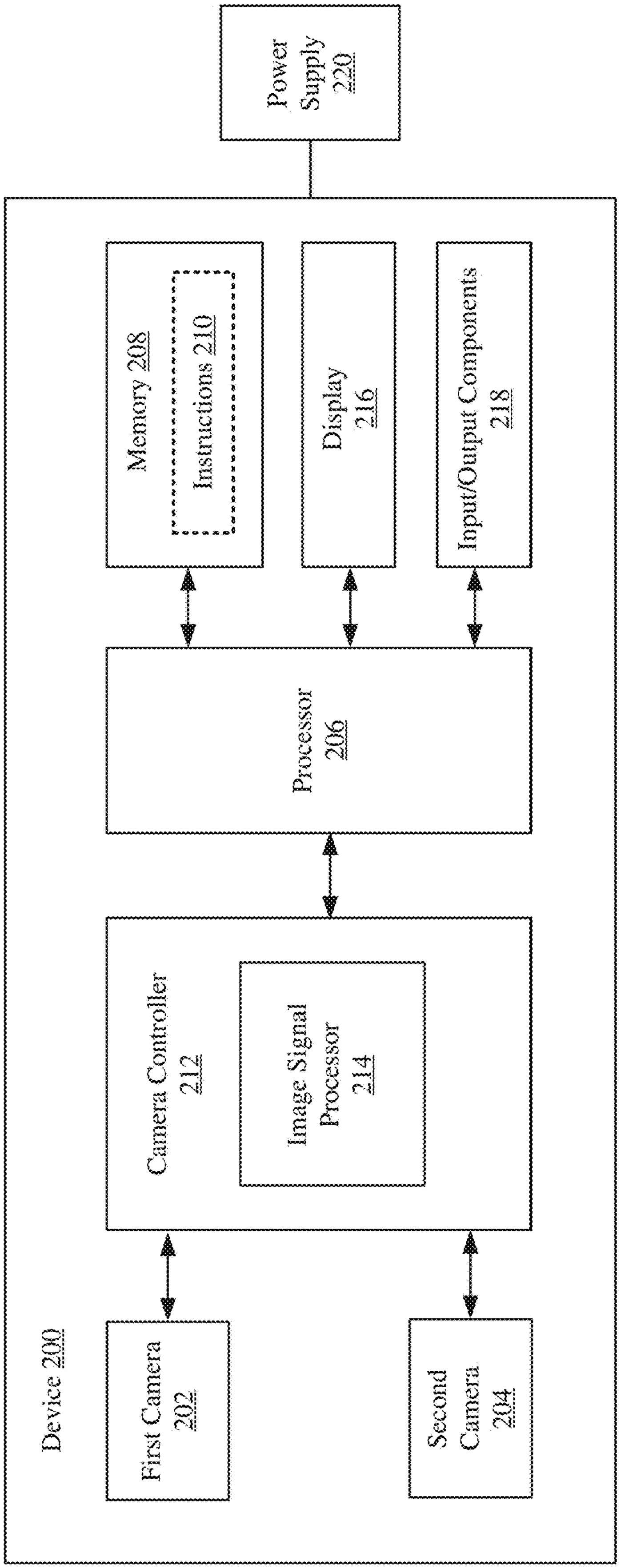
FIG. 2A is a block diagram of an example device for image processing.

FIG. 2A is a block diagram of an example device 200 including multiple cameras. The example device 200, which may be one implementation of the devices 100 and 110 of FIGS. 1A and 1B, may be any suitable device capable of capturing images or video including, for example, wired and wireless communication devices (such as camera phones, smartphones, tablets, security systems, dash cameras, laptop computers, desktop computers, wearable cameras, drones, and so on), digital cameras (including still cameras, video cameras, and so on), or any other suitable device. The example device 200 is shown in FIG. 2A to include a first camera 202, a second camera 204, a processor 206, a memory 208 storing instructions 210, a camera controller 212, a display 216, and a number of input/output (I/O) components 218. The device 200 may include additional features or components not shown. For example, a wireless interface, which may include a number of transceivers and a baseband processor, may be included for a wireless communication device. Device 200 may include additional cameras other than the first camera 202 and the second camera 204. The disclosure should not be limited to any specific examples or illustrations, including example device 200.

The first camera 202 and the second camera 204 may be capable of capturing individual image frames (such as still images) and/or capturing video (such as a succession of captured image frames). A succession of still images or video from a camera may be called an image stream. The first camera 202 and the second camera 204 may include one or more image sensors (not shown for simplicity) and shutters for capturing an image stream and providing the captured image stream to the camera controller 212.

The memory 208 may be a non-transient or non-transitory computer readable medium storing computer-executable instructions 210 to perform all or a portion of one or more operations described in this disclosure. The device 200 may also include a power supply 220, which may be coupled to or integrated into the device 200.

The processor 206 may be one or more suitable processors capable of executing scripts or instructions of one or more software programs (such as instructions 210) stored within the memory 208. In some aspects, the processor 206 may be one or more general purpose processors that execute instructions 210 to cause the device 200 to perform any number of different functions or operations. In additional or alternative aspects, the processor 206 may include integrated circuits or other hardware to perform functions or operations without the use of software. While shown to be coupled to each other via the processor 206 in the example of FIG. 2, the processor 206, memory 208, camera controller 212, the display 216, and I/O components 218 may be coupled to one another in various arrangements. For example, the processor 206, the memory 208, the camera controller 212, the display 216, and/or the I/O components 218 may be coupled to each other via one or more local buses (not shown for simplicity).

The display 216 may be any suitable display or screen allowing for user interaction and/or to present items (such as captured images and video) for viewing by a user. In some aspects, the display 216 may be a touch-sensitive display. The I/O components 218 may be or include any suitable mechanism, interface, or device to receive input (such as commands) from the user and to provide output to the user. For example, the I/O components 218 may include (but are not limited to) a graphical user interface, keyboard, mouse, microphone and speakers, and so on.

The camera controller 212 may include an image signal processor 214, which may be one or more image signal processors, to process captured image frames or video provided by the first camera 202 and/or the second camera 204. In some example implementations, the camera controller 212 (such as by using the image signal processor 214) may control operation of the first camera 202 and the second camera 204. In some aspects, the image signal processor 214 may execute instructions from a memory (such as instructions 210 from the memory 208 or instructions stored in a separate memory coupled to the image signal processor 214) to control operation of the cameras 202 and 204 and/or to process and provide one or more image streams for recording or previewing. In other aspects, the image signal processor 214 may include specific hardware to control operation of the cameras 202 and 204 and/or to process and provide one or more image streams for recording or previewing. The image signal processor 214 may alternatively or additionally include a combination of specific hardware and the ability to execute software instructions.

Figure 2B:
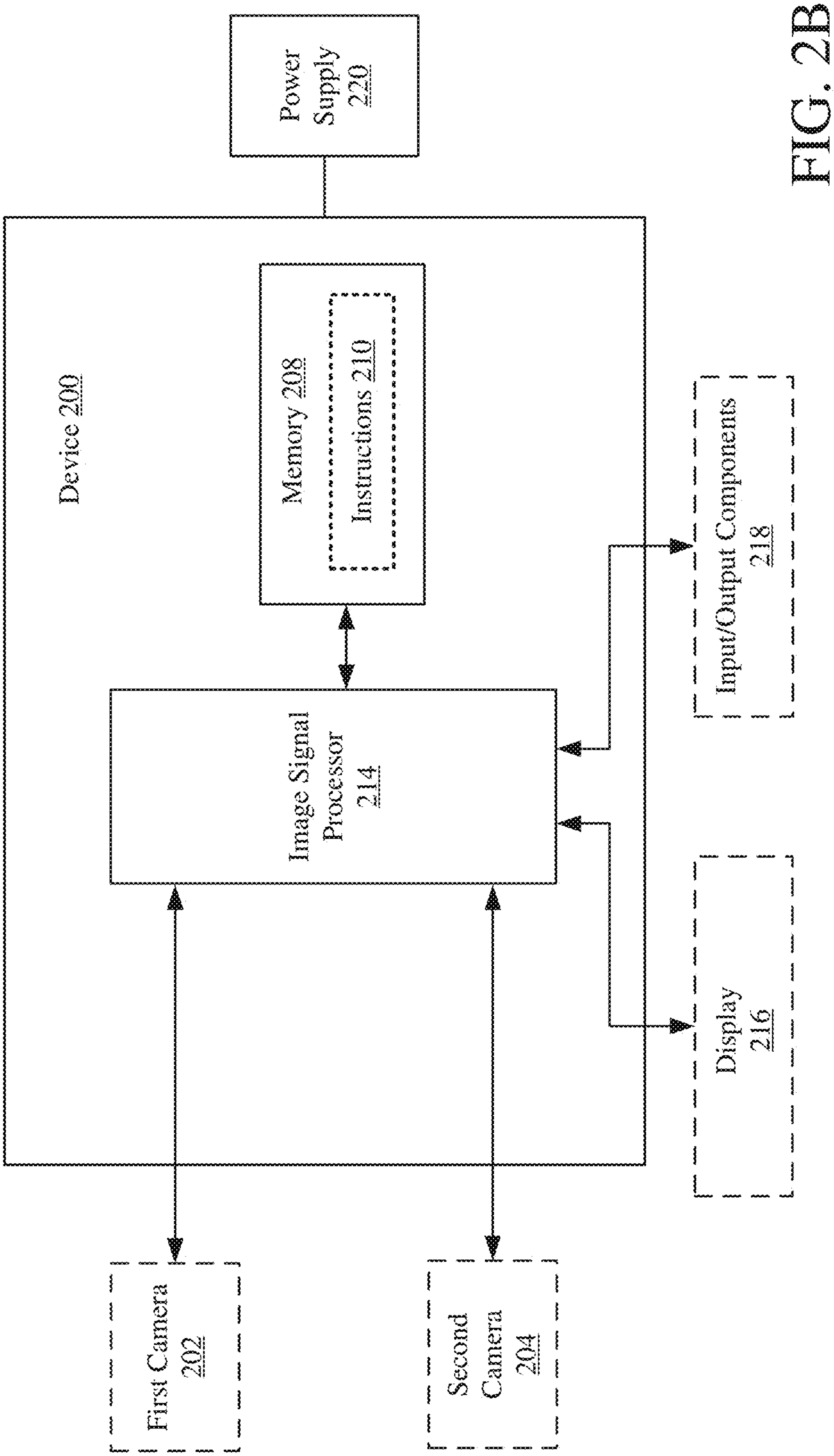
FIG. 2B is another block diagram of an example device for image processing.

While FIG. 2A illustrates an example implementation of a device 200, device 200 is not required to include all of the components shown in FIG. 2A. FIG. 2B illustrates another example implementation of device 200, showing that device 200 need not include all of the components illustrated in FIG. 2A. For example, device 200 may include the image signal processor 214 (which may be part of a camera controller) and memory 208 including instructions 210, and may be coupled to or include a power supply 220. First camera 202 and second camera 204 may be separate from and coupled to device 200 (such as for a security system, desktop computer, or other devices where the cameras are remote to the device). In some example implementations, device 200 receives capture streams from the cameras for processing and provides commands to the cameras for positioning the camera.

Alternatively or additionally, display 216 may be separate from and coupled to device 200. In one example, display 216 may be a wireless display coupled to the device performing the image processing. For example, a drone may provide captures to a user's tablet or smartphone for preview, and the drone may include an image signal processor to fully process any captures intended for recording. I/O components 218 may also be separate from device 200. For example, if the input is a graphic user interface, some or all of the I/O components may be part of display 216.

As shown, various device configurations and types may be used in implementing aspects of the present disclosure. As a result, the disclosure should not be limited to a specific device configuration or type.

Figure 3:
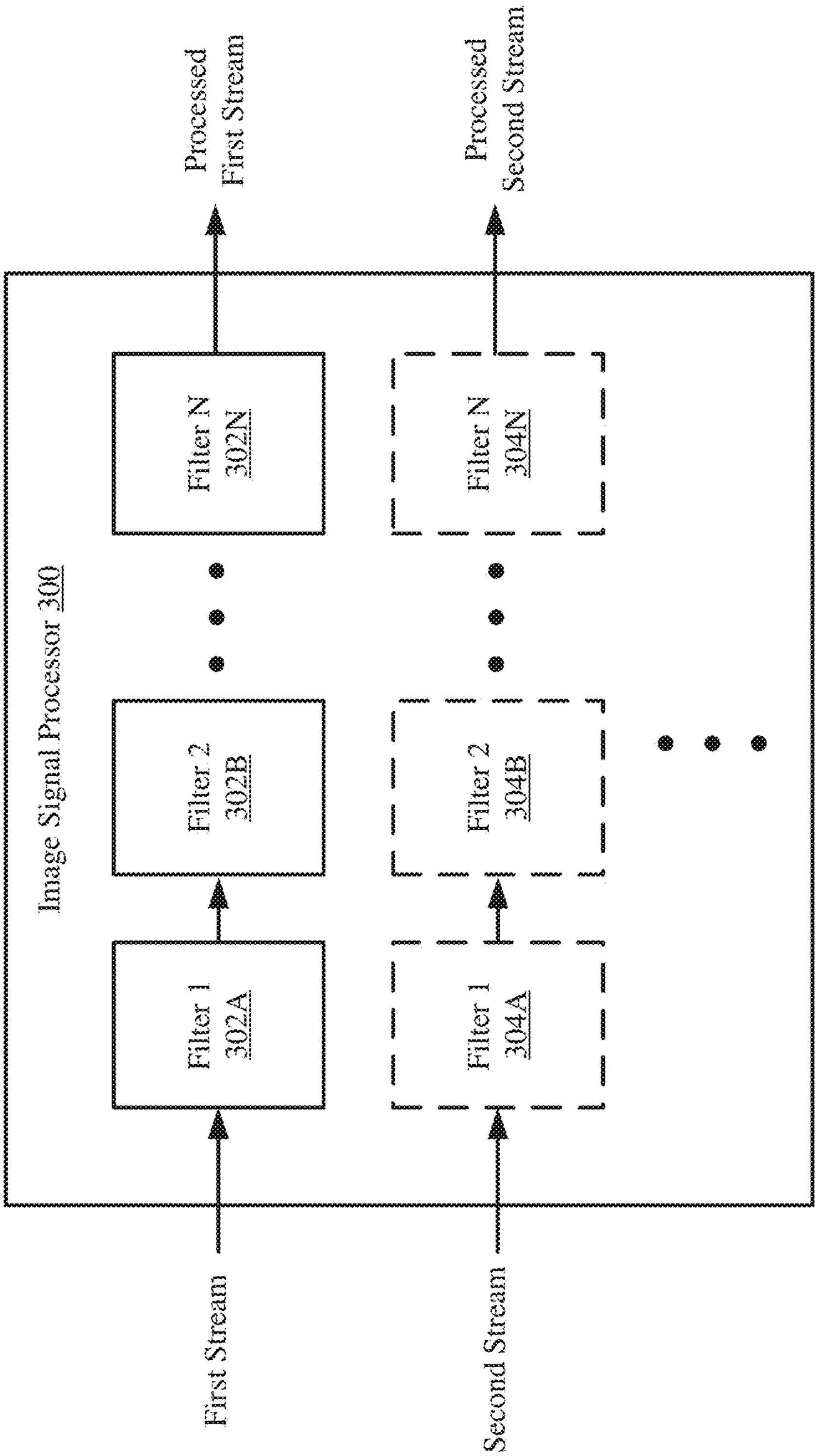
FIG. 3 is a block diagram of an example image signal processor.

FIG. 3 is a block diagram of an example image signal processor 300. The image signal processor 300 may be one implementation of the image signal processor 214 of the camera controller 212 illustrated in FIG. 2. The image signal processor 300 may be a single thread (or single core) processor with a sequence of filters 302A-302N to process a first image stream. In one example implementation, filter 1 (302A) may be a noise reduction filter, filter 2 (302B) may be an edge enhancement filter, and filter N (302N) may be a final filter to complete processing the image stream. Alternatively, the image signal processor 300 may be a multiple thread (or multiple core) processor with one or more additional sequences of filters 304A-304N to process other image streams.

When a user utilizes a conventional device to record or capture a scene (such as a father using a smartphone to record his child's soccer game or plano recital), the scene is typically previewed on a display of the device. When the user zooms into a portion of the scene (such as the father zooming in on his child), the device typically previews the zoomed in portion of the scene. If the zoom is a digital zoom, the device may preview only a portion of the scene being captured by the device's camera(s). In this manner, a conventional camera controller may output for preview only a portion of the image stream being captured. If a user loses track of an object to be recorded in a zoomed in view and the preview does not show the object, the user may have difficulties positioning (such as moving (e.g., left, right, up, down, and diagonally) or orienting (e.g., panning, tilting, and rotating) the camera to find the object in the preview.) For example, if the aforementioned father does not see his child in a zoomed in preview, the father may have difficulties determining the direction and distance in which to change the position of the camera to locate his child.

Figure 4A:
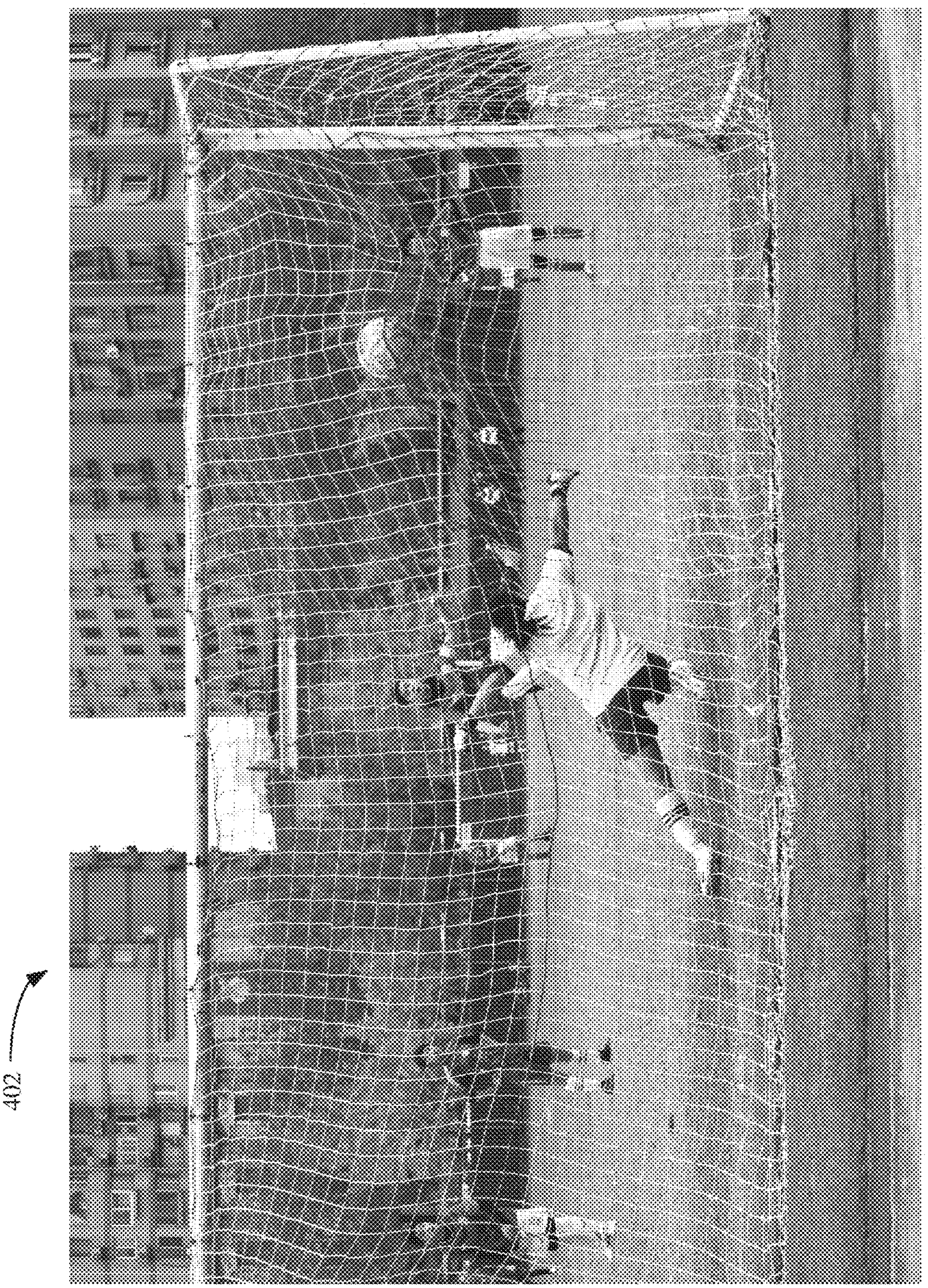
FIG. 4A illustrates an example scene being captured by a camera.
Figure 4B:
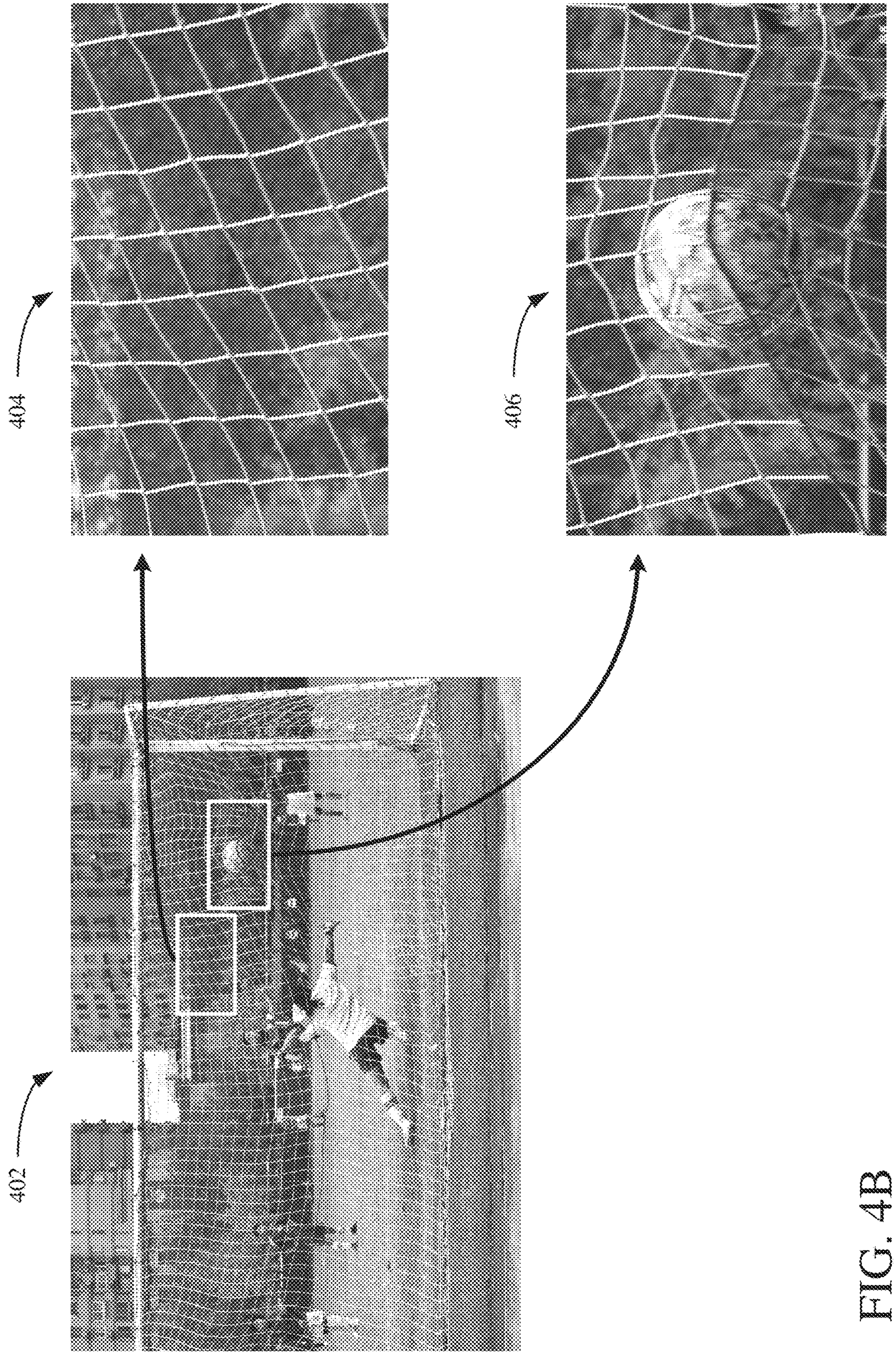
FIG. 4B illustrates the example scene of FIG. 4A, an intended portion of the scene of FIG. 4A to be recorded, and an actual portion of the scene of FIG. 4A being recorded.

FIG. 4A illustrates an example scene 402 being captured by a camera. For purposes of discussion herein, the example scene 402 is captured or recorded by the first camera 202 or the second camera 204 (or both the first camera 202 and the second camera 204) of the device 200 of FIG. 2. The example scene 402 is of a player scoring a goal during practice. A user may wish to zoom in on the ball while recording the scene 402, and a preview of the zoomed-in scene being recorded may differ from what the user intends to record. FIG. 4B depicts the example scene 402 of FIG. 4A, depicts an actual portion 404 of the zoomed-in scene being or to be recorded, and depicts an intended portion 406 of the scene to be recorded. If the device previews the portion 404 of the scene being or to be recorded, the user may have difficulties determining that the location of the intended portion 406 of the scene to be recorded is, in this example, to the right and below the location of the portion 404 of the scene being or to be recorded. As a result, the user may not know in which direction to move or orient the camera. For example, the user may spend time moving the device to try to find the ball in the zoomed in view, or may expend device resources zooming out and again zooming in to relocate the ball in the preview. As a result, a user may be too late in recording a wanted image or video or otherwise lose opportunities in recording an intended object at an intended time (such as recording his child when scoring a goal).

In accordance with various aspects of the present disclosure, a display (such as example display 216, which may be coupled to or included in a device) may be configured to assist a user in positioning one or more cameras. In some implementations, the display may preview a scene being captured by a camera (which includes the portion of the scene being or to be recorded). In the preview of the scene, a display (in communication with an image processing device) may display a visual indication of the portion of the scene being or to be recorded. In this manner, the user is able to readily determine the location of the portion of the scene being or to be recorded with respect to the scene being captured.

Figure 5A:
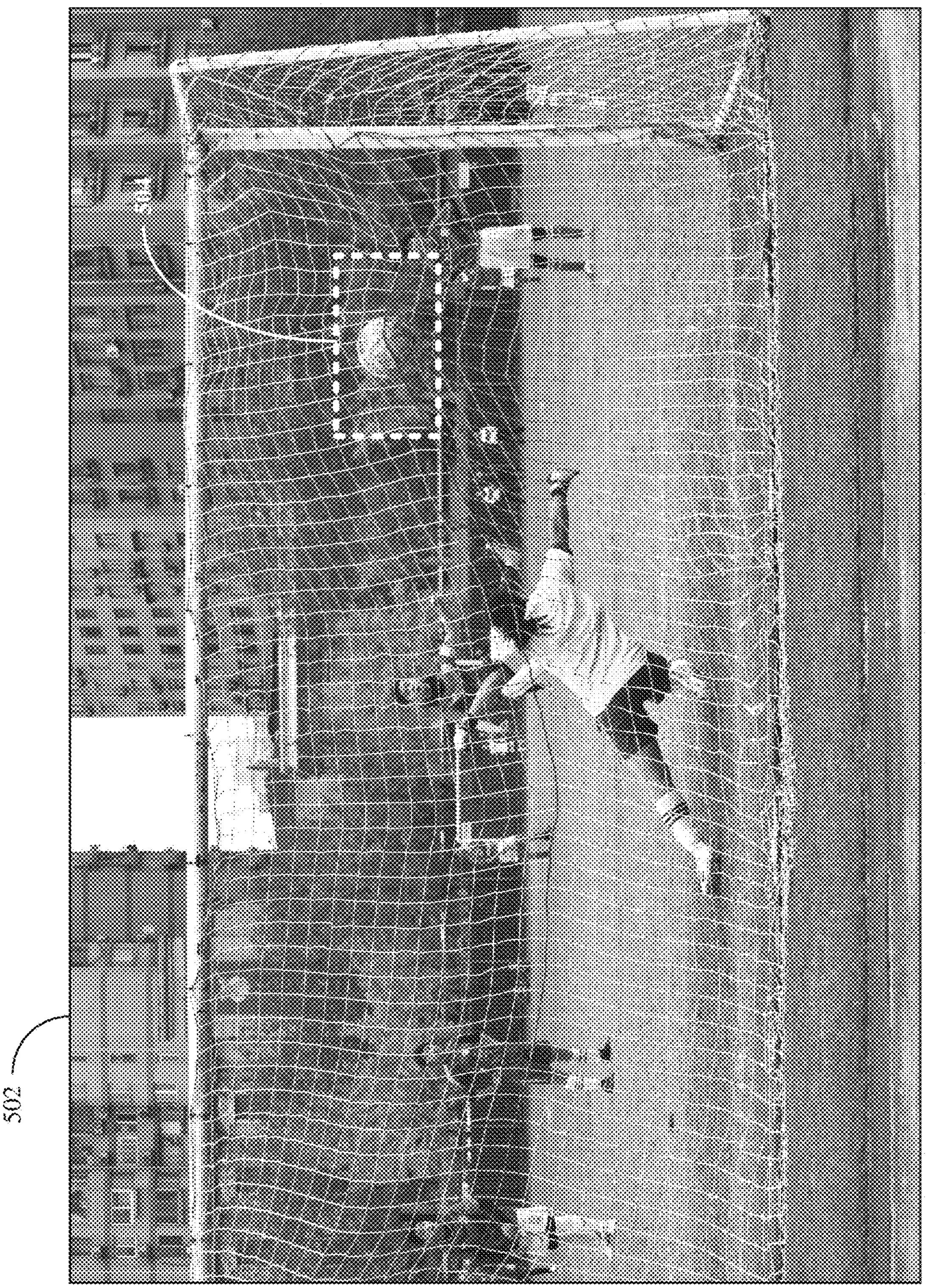
FIG. 5A illustrates an example display previewing the scene of FIG. 4A being captured and a visual indication of the portion of the scene of FIG. 4A being or to be recorded.

FIG. 5A illustrates an example display 502 previewing the scene 402 of FIG. 4A being captured and a visual indication 504 of the portion of the scene being or to be recorded. For simplicity and brevity, discussions related to a portion of a scene being or to be recorded, as indicated by the visual indication of this disclosure, may be referred to as a portion of the scene being recorded. The display 502 may be display 216 of the device 200 of FIGS. 2A and 2B, with the device 200 recording the portion of the scene indicated by visual indication 504, but any suitable device configuration may be used. While the visual indication 504 is illustrated as a dashed rectangle that indicates the portion of the scene being recorded, the visual indication 504 may take any form to indicate the portion of the scene being recorded. In some other examples, the visual indication 504 may indicate the portion of the scene as a grayed colored area or other contrasted area of the preview, may indicate the corners of the portion of the scene being recorded, include a marker identifying the center of the portion of the scene being recorded, a solid line box indicating the portion of the scene being recorded, and so on. In addition, recording a portion of the scene includes recording video as well as one or more still images. In this manner, a user may prepare the visual indication 504 to be centered on a portion of the scene for an upcoming image or video to be recorded.

Figure 5B:
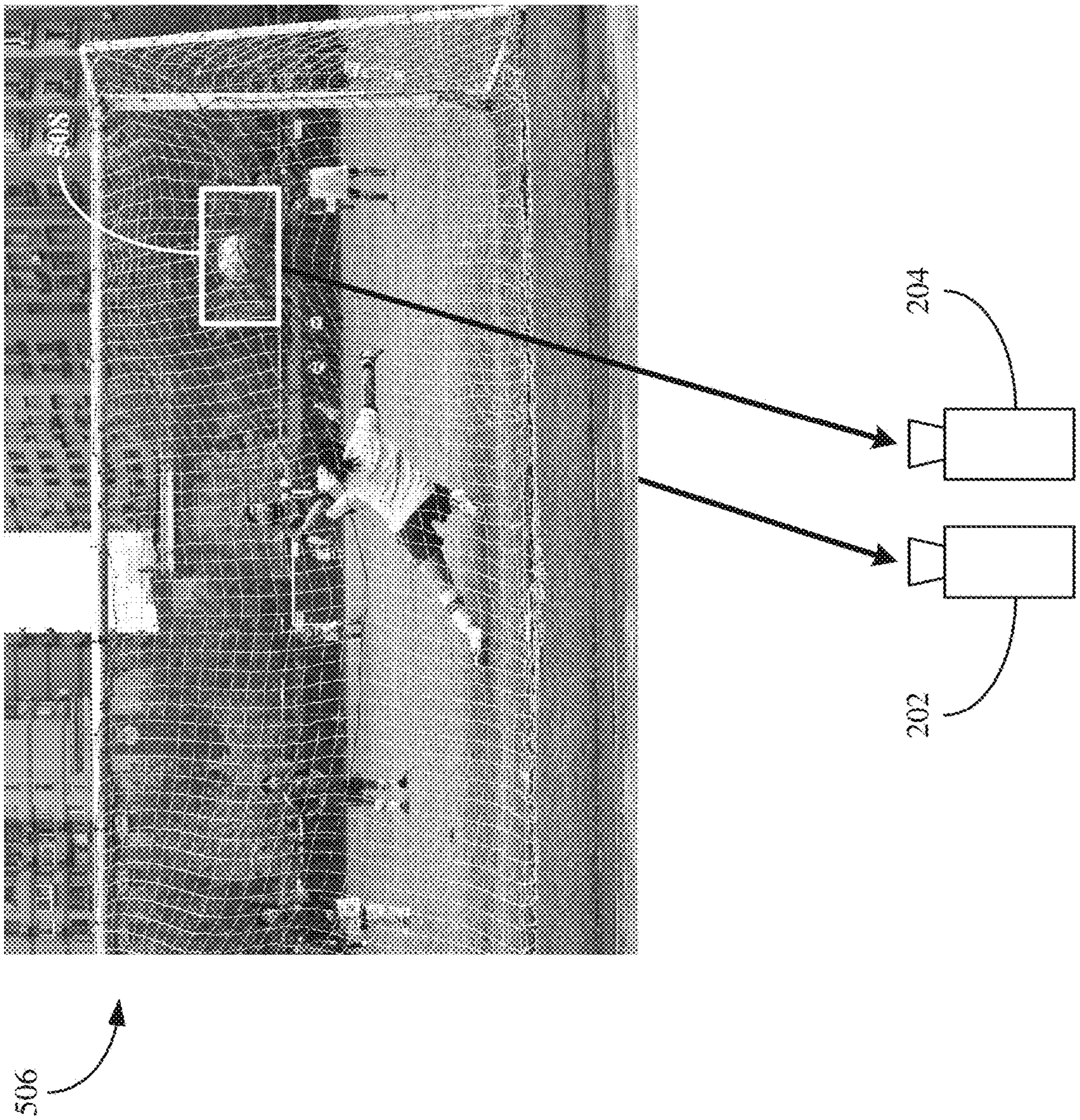
FIG. 5B illustrates an example of a first camera capturing the scene of FIG. 4A and a second camera capturing the portion of the scene of FIG. 4A being or to be recorded.

One camera's capture stream may include an entire scene, and a spatial portion (e.g., the spatial portion of the scene defined/bounded by the visual indication 504) of that stream is output (such as by the camera controller 212 of FIG. 2) for recording. Alternatively, a first camera's stream may include the entire scene while a second camera's stream includes the portion of the scene being or to be recorded. FIG. 5B illustrates an example of the first camera 202 of the device 200 capturing the scene 506 and the second camera 204 of the device 200 capturing the portion 508 being or to be recorded of the scene 506. In this manner, a display 216 may preview the scene 506 being captured by the first camera 202 and present (e.g., display) a visual indication which includes the portion 508 (of the scene 506) being captured by the second camera 204 for recording.

In additional or alternative implementations, a device may be configured to record either or both of the capture streams. In one example, the device may request a user to select one of the streams to be recorded or automatically select the stream to be recorded. In another example, one capture stream may be used exclusively for previews. The device may request the user to select which capture stream to use for preview, or the device may automatically select the capture stream to be used for preview. In a further example, the device automatically records both capture streams. If recording both capture streams, a user may be requested to select one or both of the recordings for storage (discarding the unselected recordings).

In some example implementations, the first camera 202 and the second camera 204 are part of the dual camera of the device 200. In some dual cameras, the two cameras 202 and 204 have similar capabilities, such as resolution, color palette, zoom, focal length, shutter speed, and so on. Alternatively, the two cameras 202 and 204 may have different capabilities. In some examples, the first camera 202 may be a color camera and the second camera 204 may be a black and white camera that may have better fidelity in low light settings. In some other examples, the first camera 202 may be a high resolution camera (such as 8 megapixels, 13 megapixels, and so on) and the second camera 204 may be a lower resolution camera than the first camera 202, for example, to assist the first camera with auto-focus. In some further examples, the first camera 202 may be a wide angle view camera and the second camera 204 may be a narrower field of view camera with a longer focal length than the first camera 202, for example, to capture objects further away from the device. Some devices may include different configurations of a dual camera, and other devices may include more than two cameras. Implementations of the present disclosure apply to any camera configuration and type of device. The provided examples using a two camera configuration are provided only for illustrative purposes, and the disclosure should not be limited to or by any of the provided examples.

Figure 6:
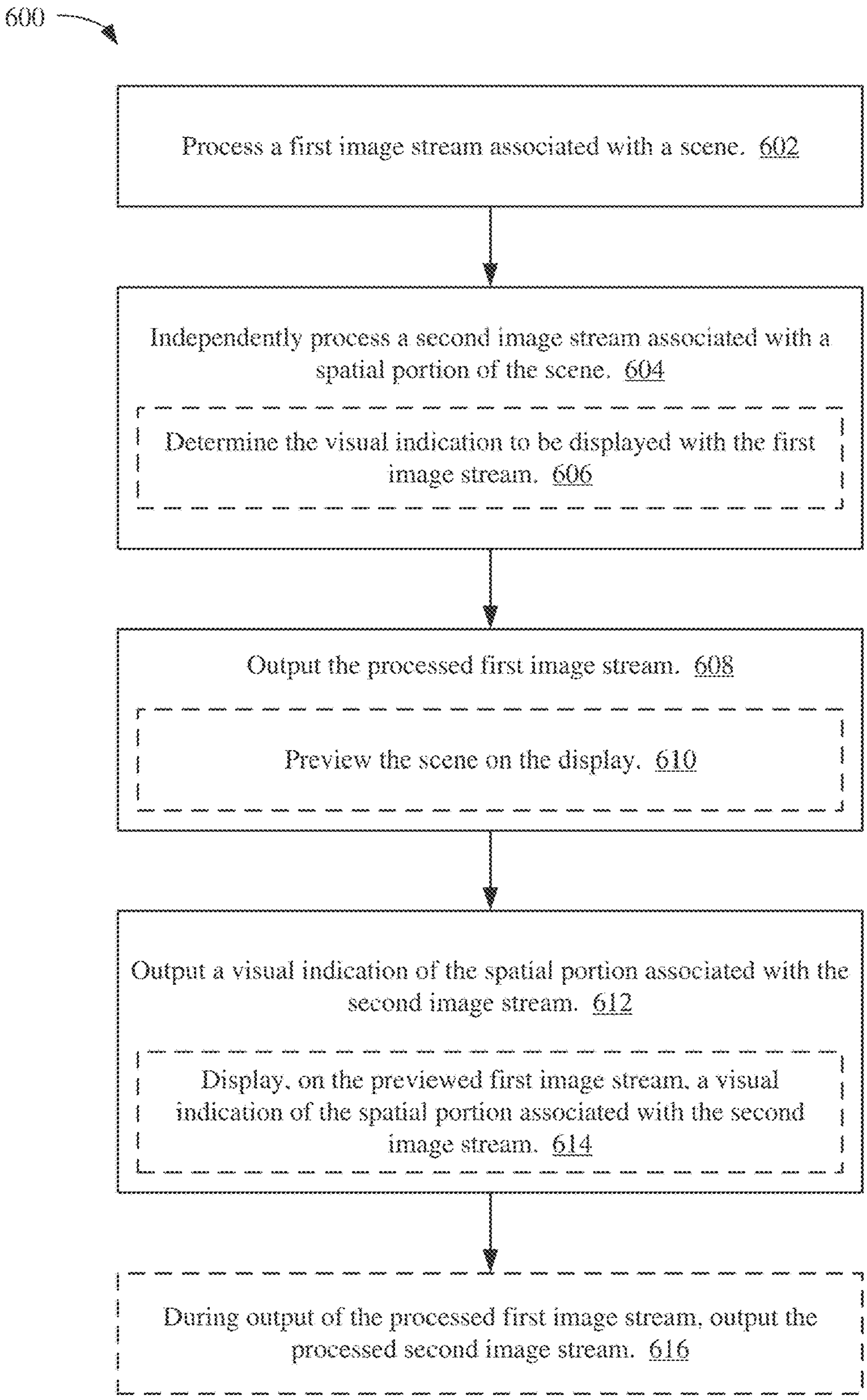
FIG. 6 is an illustrative flow chart depicting an example operation for outputting a visual indication.

FIG. 6 is an illustrative flow chart depicting an example operation 600 for outputting a visual indication. The outputted visual indication may be presented on a display to assist a user in positioning a camera so that the device may receive capture streams including the intended scene being recorded. For example, a user may use the visual indication the identify how to position a camera in order to have its field of view include an intended scene. The example operation 600 is described below with respect to two image streams (such as a first image stream from the first camera 202 and a second image stream from the second camera 204 of the device 200). However, aspects apply to any number of image streams (including one image stream or three or more image streams).

While the example operations (including example operation 600) are described regarding a device 200, camera controller 212, or image signal processor 214, any capable component or module may perform the operation. For example, even though a device 200 or a camera controller 212 may be described as performing an operation, an image signal processor 214 (such as in FIG. 2A or 2B), processor 206 (FIG. 2A), camera controller 212 (FIG. 2A) or other module or component may perform the operation. Further, the term "output" may include providing to a separate device, providing to a remote display, displaying on an included display of a device, providing from one component of a device to another component of the device, or providing from one component of a device to a module external to the device. The disclosure should not be limited to specific components or modules performing operations as described in the example operations.

Beginning at 602, the device 200 may process a first image stream associated with an entirety of a scene. In one example, the first camera 202 may capture the scene 506 (FIG. 5B) and provide the first image stream to the camera controller 212 of device 200, which processes the incoming first image stream. In another example, the camera controller 212 of device 200 processes an image stream received from another device or stored in a memory (such as memory 208). In some example implementations, the image signal processor 214 may process the first image stream. For example, the image signal processor 300 (FIG. 3) may apply filters 302A-302N to the first image stream. Additionally or alternatively, the image signal processor 300 may perform other functions to the first image stream, such as cropping, zooming, de-interlacing, and so on.

The camera controller 212 of device 200 may also independently process a second image stream associated with a spatial portion (e.g., a portion less than or equal to an entirety) of the scene in the first image stream (604). In one example, the second camera 204 may capture the spatial portion 508 of the scene 506 (FIG. 5B) and provide the resulting second image stream to the camera controller 212, which processes the incoming second image stream. In other examples, the second image stream may be provided by another device or from memory (such as the memory 208). Referring to the previous example of the image signal processor 300 applying filters 302A-302N to the first image stream, the image signal processor 300 may apply filters 304A-304N to the second image stream, and may also or alternatively perform other functions, such as cropping, zooming, de-interlacing, and so on.

In some example implementations for processing the second image stream, the device 200 (such as camera controller 212 or image signal processor 214) may determine the size and location of a visual indication in the scene 506 of the first image stream (606). For example, the device 200 may embed the visual indication into the processed first image stream, create a layer on the processed first image stream, augment the processed first image stream and so on, so that the captured scene 506 and the visual indication may be displayed concurrently (such as on a display 216).

It should be noted that this disclosure should not be limited to the second camera 204 having a smaller field of view than the first camera 202. For example, the cameras may be at different zoom levels so that a camera with a larger field of view than the other camera captures a smaller portion of the scene than the other camera. Additionally, as previously noted, the image signal processor 214 may be any number of processors, threads, and/or cores. In some example implementations, the image signal processor 214 and the processor 206 may be part of a System on Chip (SoC). As such, it should be noted that various aspects of the present disclosure are not limited to any specific hardware.

Proceeding to 608, the device 200 may output the processed first image stream for preview. In some example implementations, the camera controller 212 may generate the processed first image stream. Upon generating the processed first image stream, the device 200 may preview the scene 506 on display 216 (610). For example, device 200 may output the processed first image stream to display 216, and display 216 previews the scene 506 by displaying the processed first image stream. During or after generating and outputting the processed first image stream (such as by camera controller 212), the visual indication of the spatial portion of the scene associated with the second image stream may also be output (612). The display 216 may optionally display the visual indication on the scene 506 being previewed (614). For example, the processed first image stream may include the visual indication or otherwise be linked to the visual indication so that camera controller 212 can associate the visual indication with the portion of the scene to be recorded in the processed first image stream.

While example operation 600 shows processing the image streams in sequence and generating the processed first image stream and the visual indication in sequence, processing different image streams may be performed concurrently and outputting or generating a processed image stream and visual indication may also be performed concurrently. The processed second image stream may be output while outputting the processed first image stream. For example, the camera controller 212 may generate at least a portion of the processed second image stream associated with the portion of the scene being recorded. The processed image stream may be stored in a memory of the device (such as memory 208) or output to another device or memory. If the display 216 previews the processed first image stream and the visual indication, the visual indication indicates the portion of the scene captured in the processed first image stream being recorded in at least a portion of the second image stream.

While the example operation 600 (and the other example operations in this disclosure) describes using the processed second image stream for recording, only a portion of the processed second image stream might be used for recording. For example, a digital zoom may be used for the second camera 204 so that the entire scene captured by the second camera 204 is not to be recorded. It should be noted that an image stream may refer to one or more temporal or spatial portions of the image stream or the stream in its entirety, and the disclosure should not be limited to a specific implementation of an image stream.

With a visual indication shown on a preview of the scene, the user may better understand how to move the device or the cameras in order to locate an object of interest in the stream (or portion of the stream) being or to be recorded. The preview of the scene with the visual indication may be called a "zoom assist" preview. In some example implementations, the user may wish to switch between two or more of: (1) the zoom assist preview in which the preview may depict both an indication of the portion of a scene being recorded as well as a preview of the entire scene being captured; (2) a conventional preview in which the preview may depict only what is being recorded; (3) a concurrent view in which a combination of the zoom assist preview and the conventional preview are depicted (such as a side-by-side (SBS) view, picture in picture (PiP) view, windowed view, etc., of the zoom assist preview and the convention preview); (4) an alternative preview in which the preview may depict a different portion of the scene than the conventional preview; (5) a different zoom level preview in which the preview may depict a portion of the scene at a different zoom level (such as a different digital zoom level) than the conventional preview; or (6) a concurrent view in which a combination of two or more of the above previews a depicted.

Figure 7:
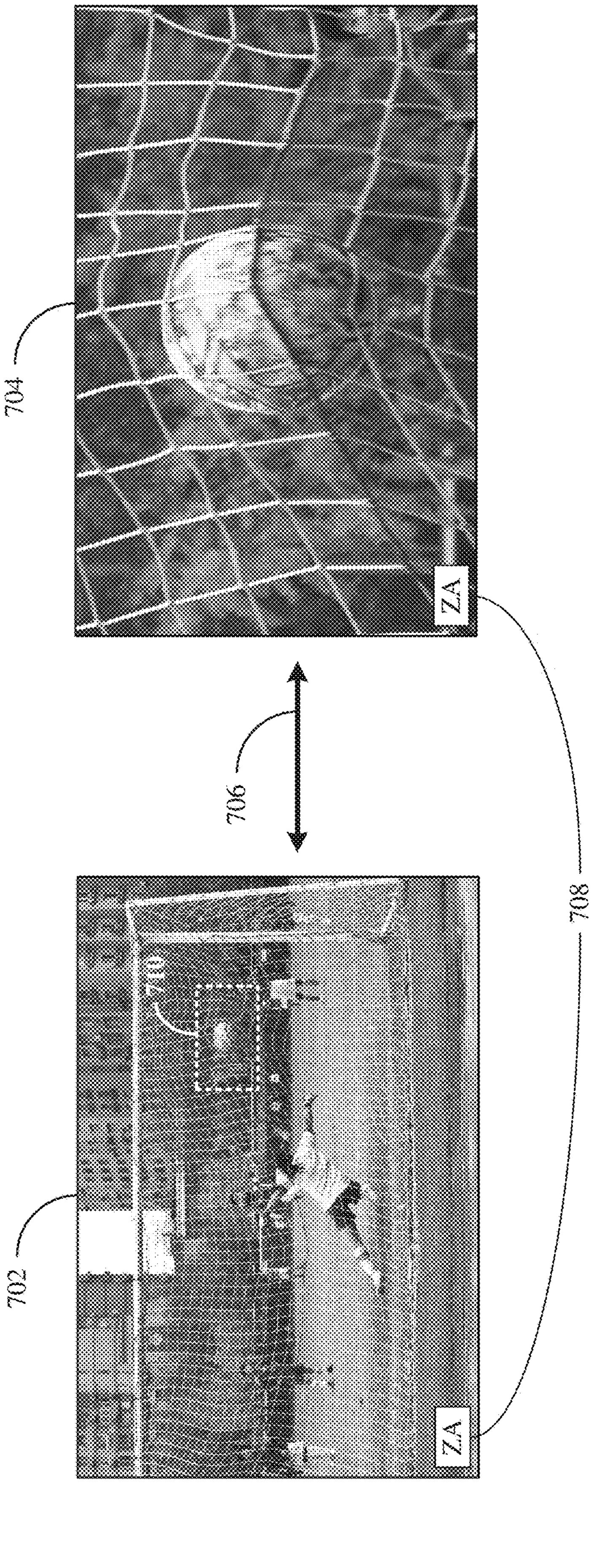
FIG. 7 illustrates an example of a display switching between a preview of the scene of FIG. 4A being captured and the portion of the scene of FIG. 4A being or to be recorded.

FIG. 7 illustrates an example switching operation 706 of the display 216 between a zoom assist preview 702 and a preview 704 of the portion of the scene being or to be recorded. In some example implementations, the device 200 may allow a button, a menu, a gesture, or other user-based command to determine when to switch between the previews 702 and 704. In some implementations, the command toggles between activation and deactivation of the zoom assist preview functionality. In some other implementations, the command changes the preview while one or more other previews are still generated but not displayed or output for display.

In one example, the display 216 may present a zoom assist button 708 to allow the user to switch between previews 702 and 704, with the preview 702 including a visual indication 710 indicating the portion of the scene being or to be recorded. In other examples, the user may use a swipe gesture, shake the device 200, or provide audible, visual or other touch commands to switch between the previews 702 and 704.

Additionally or alternatively, the decision to switch between the previews 702 and 704 may be determined automatically (e.g., "on-the-fly") by the device 200 based on one or more criteria. For example, one or more criteria for causing the device 200 to switch from preview 704 to preview 702 may include camera movement, an object moving into the portion of the scene being captured, motion of an object of interest (e.g., an object of interest may be automatically tracked by the device 200 for recording), and so on, that may cause the device 200 to present the zoom assist preview 702 to assist a user in positioning the first camera 202 and/or the second camera 204. Likewise, one or more criteria for causing the device 200 to switch from the preview 702 to the preview 704 may include an assessment (or analysis) of a determined amount of motion, determined depth, and/or determined size of, for example, an object of interest that is being tracked (e.g., tracked based on user selection or predetermined criteria) relative to various associated threshold levels.

Figure 8:
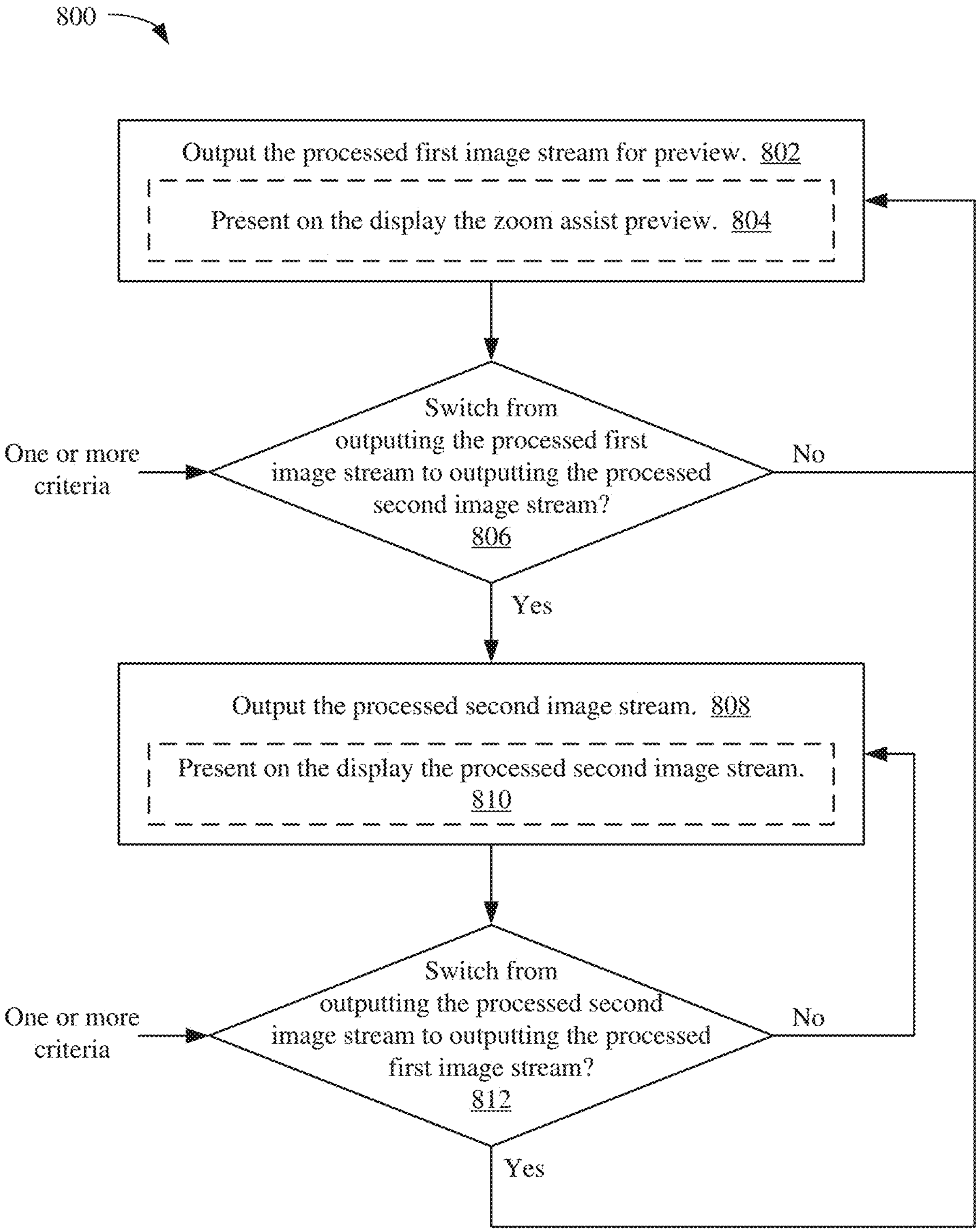
FIG. 8 is an illustrative flow chart depicting an example operation for switching between a scene being captured and a portion of the scene being or to be recorded.

FIG. 8 is an illustrative flow chart depicting an example operation 800 for switching between a scene being captured (such as the scene in a first image stream being captured by the first camera 202) and a portion of the scene being or to be recorded (such as at least a portion of the second image stream captured by the second camera 204). For example, the camera controller 212 (operating alone or in collaboration with other components such as the processor 206) may determine whether to switch between outputting (such as for preview) the processed first image stream (and the visual indication) and the processed second image stream. The output image stream may be the image stream previewed by the display 216.

In some example implementations, the camera controller 212 may generate for recording more than one image stream (such as both the first image stream and the second image stream). In one example, the camera controller 212 may generate and output for recording the processed image stream not currently being previewed. A user may be presented an option of selecting which recorded image stream to keep, such as by being able to review each image stream and select the image stream being reviewed to be kept or deleted. While the example operation 800 shows switching between an image stream being captured and an image stream being recorded, both image streams may be recorded, and the disclosure should not be limited to recording one image stream or recording as shown in the specific examples provided.

Beginning at 802, a processed first image stream may be generated for preview. For example, the camera controller 212 (such as by using the image signal processor 214) may generate the processed first image stream. The display 216 may optionally display the zoom assist preview, for example, by presenting the processed first image stream and the visual indication (804). Referring back to FIG. 7, the display 216 may display the zoom assist preview 702 with the visual indication 710. The device 200 may then determine from one or more criteria (such as a user tapping a zoom assist button, swiping the screen, movement in the scene, camera movement, and so on) if the device 200 is to switch from outputting the processed first image stream to outputting the processed second image stream (806). For example, the device 200 determines if the display 216 should switch from the zoom assist preview 702 to the preview 704 of the scene portion being recorded, as depicted in the example of FIG. 7. If the device 200 is not to switch, then the device 200 continues to output the processed first image stream (802). For example, the display 216 continues to present the zoom assist preview 702 with the visual indication 710 (804).

If the device 200 is to switch from outputting the processed first image stream, the device 200 switches to outputting the processed second image stream for preview (808). In one example, the camera controller 212 may switch to generating the processed second image stream. In another example, the camera controller 212 generates both processed image streams, and the device 200 determines to switch outputting to display 216 from the zoom assist preview 702 to a preview 704 of the processed second image stream. In this manner, the display 216 may optionally present the processed second image stream (810), for example, by previewing to the user what is being or to be recorded.

The device 200 (such as camera controller 212) may then determine from one or more criteria (such as a change in the one or more criteria or an additional user request or input) if the device 200 is to switch from outputting the processed second image stream to the processed first image stream (812). For example, the device 200 determines if the display 216 should switch from presenting the scene portion 704 being recorded to the zoom assist preview 702 in FIG. 7. If no switch is to occur, then the device 200 continues to output the processed second image stream (808). For example, the display 216 continues to present the scene portion 704 being recorded (808). If a switch is to occur (812), the device 200 switches to outputting the processed first image stream, for example, so that the zoom assist preview may be presented on the display 216. In one example, if both processed image streams are generated by camera controller 212 or image signal processor 214, the device 200 may switch between outputting the generated image streams. In another example, the camera controller 212 may output one processed image stream and switch processed image streams to be output.

Figure 9A:
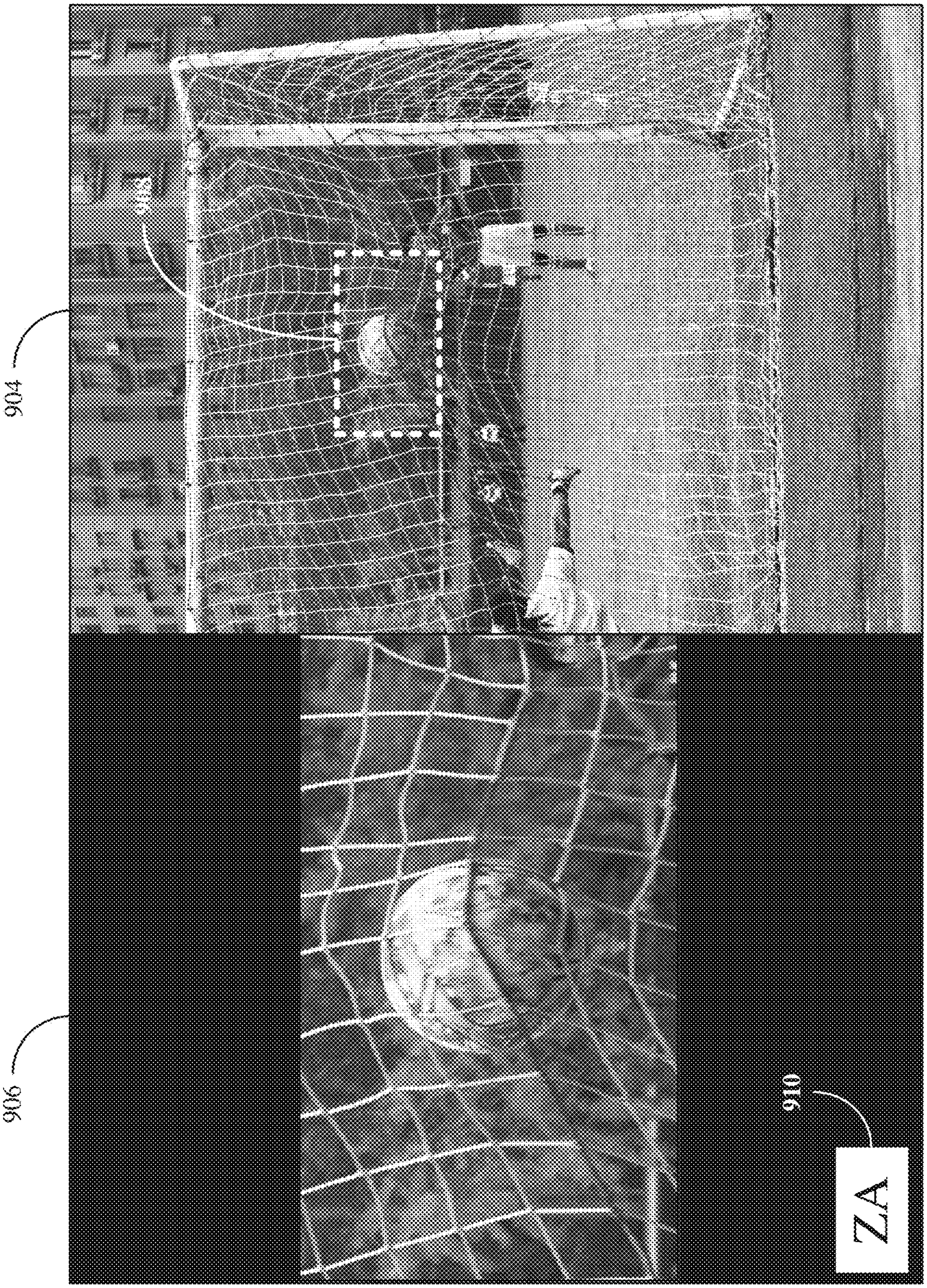
FIG. 9A illustrates an example display concurrently previewing the scene of FIG. 4A being captured and the portion of the scene of FIG. 4A being or to be recorded.

In some example implementations, the display 216 may concurrently display the zoom assist preview and the portion of the scene being or to be recorded. FIG. 9A illustrates an example display presenting a concurrent preview 902, including the zoom assist preview 904 (with a visual indication 908) and the portion of the scene 906 being recorded. The display 902, which may be one implementation of the display 216, additionally may include a button 910 to switch between previews (such as between the concurrent display of previews 904 and 906 and a preview 906 of what is being or to be recorded). While the concurrent preview 902, including previews 904 and 906, is shown as side by side, the previews 904 and 906 may be presented concurrently in any manner, such as picture in picture, separate windows, and so on. Additionally, while the preview 906 is shown in letterbox fashion, only a portion of zoom assist preview 904 is shown, and each of the previews are displayed on half of the display, all or any portion of each preview 904 and 906 may be shown on any amount of the display. For example, the display 216 may display both previews 904 and 906 in a letterbox fashion, may display only a portion of each of the previews 904 and 906, allow the user to determine how the previews 904 and 906 are to be concurrently displayed, or allow the user to change how much of the display 902 is to be used for each of the previews 904 and 906. It should therefore be noted that the disclosure should not be limited to any of the example displays or previews provided.

Figure 9B:
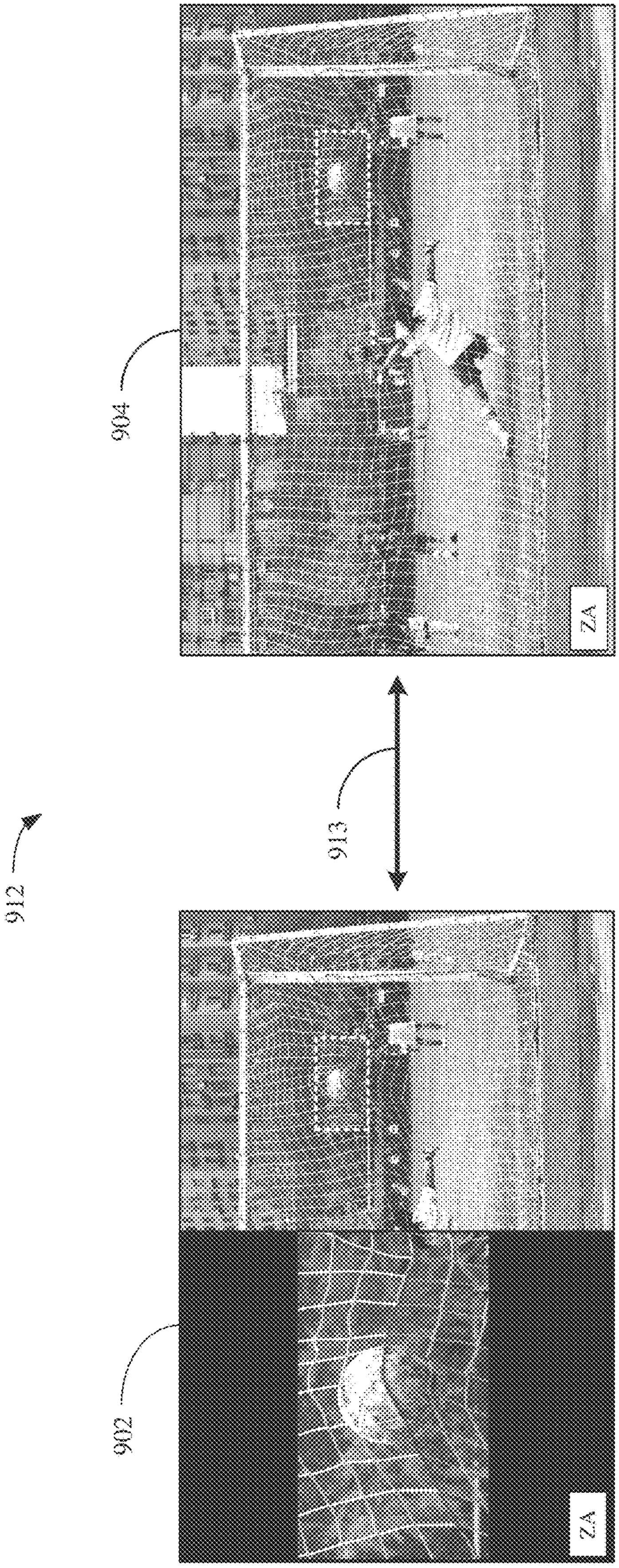
FIG. 9B illustrates an example of a display switching between a preview of the portion of the scene of FIG. 4A being or to be recorded and a concurrent preview of the scene of FIG. 4A being captured and the portion of the scene of FIG. 4A being or to be recorded.

A user may wish to switch (or the device 200 may automatically switch by switching outputs of processed image streams) between a concurrent display of previews ("concurrent preview") and the zoom assist preview. FIG. 9B illustrates an example operation 912 of a display switching between the concurrent preview 902 and the zoom assist preview 904. In one example, a user may press the zoom assist (ZA) button to switch between the previews 902 and 904. The device 200 may additionally or alternatively switch outputs to a display 216 so that the display switches between presenting previews 902 and 904 based on one or more other criteria (such as camera movement, object movement, and so on).

Figure 9C:
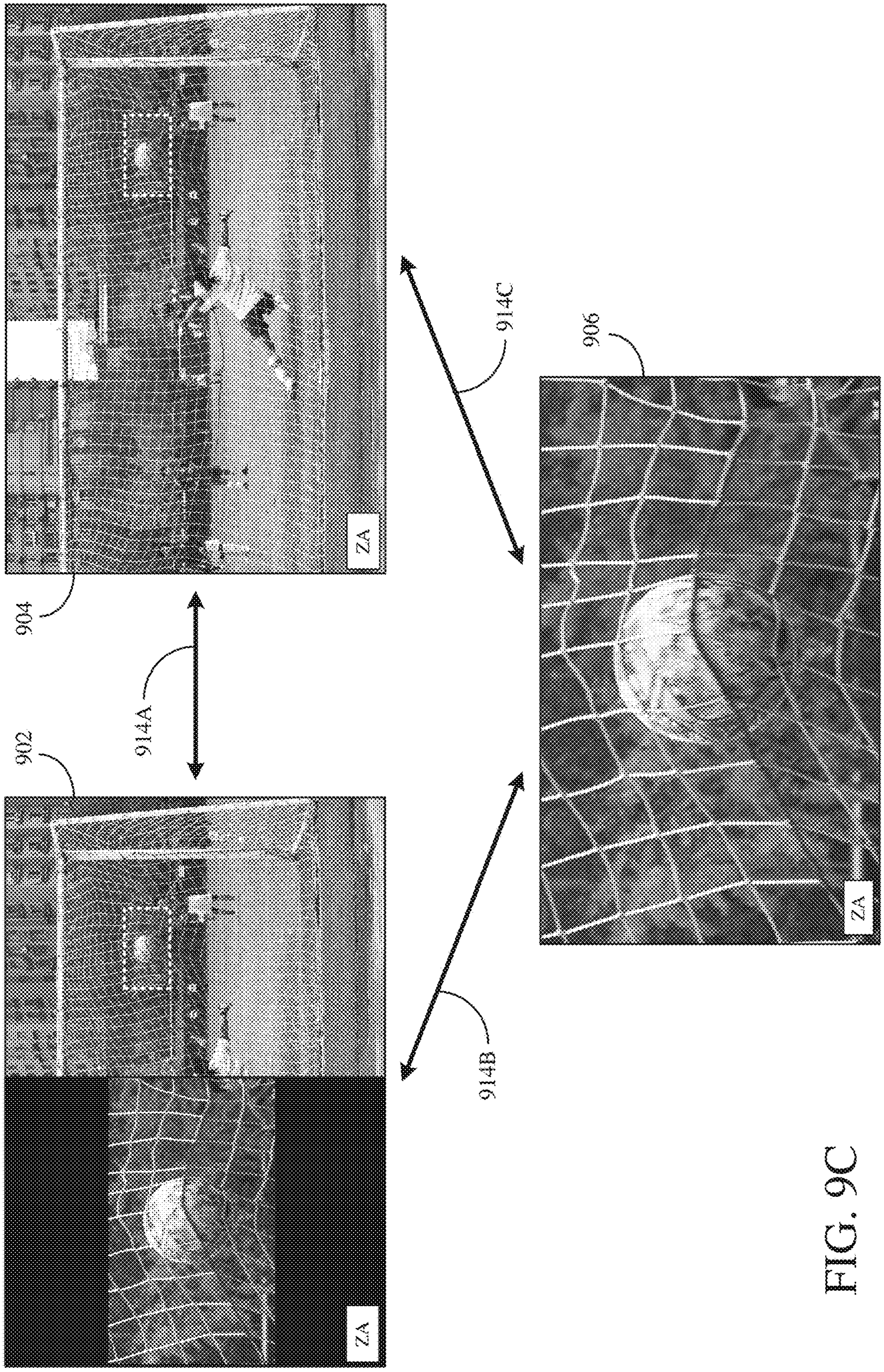
FIG. 9C illustrates an example of a display switching between a zoom assist preview of the scene of FIG. 4A, a preview of the portion of the scene of FIG. 4A being or to be recorded, and a concurrent preview of the scene of FIG. 4A.

Additionally or alternatively, the display may switch between the concurrent preview 902, the zoom assist preview 904, and a preview 906 of what is being or to be recorded. For example, the device 200 may switch between outputting the processed image streams for each of the previews. FIG. 9C illustrates an example of a display switching between the zoom assist preview 904, the preview of the portion of the scene being or to be recorded 906, and/or the concurrent preview 902, as indicated by switching operations 914A-914C. In one example, a user may press the ZA button to cycle through the previews. In another example, the display may include multiple buttons (such as soft buttons and/or physical buttons) so that a user may directly switch to an intended preview. In a further example, the user may swipe left for one preview and swipe right for the other preview (or swipe in any other direction, such as up, down, or diagonally). Other criteria may additionally or alternatively be used for the device to determine to switch previews (such as camera movement, object movement, and so on).

Figure 10:
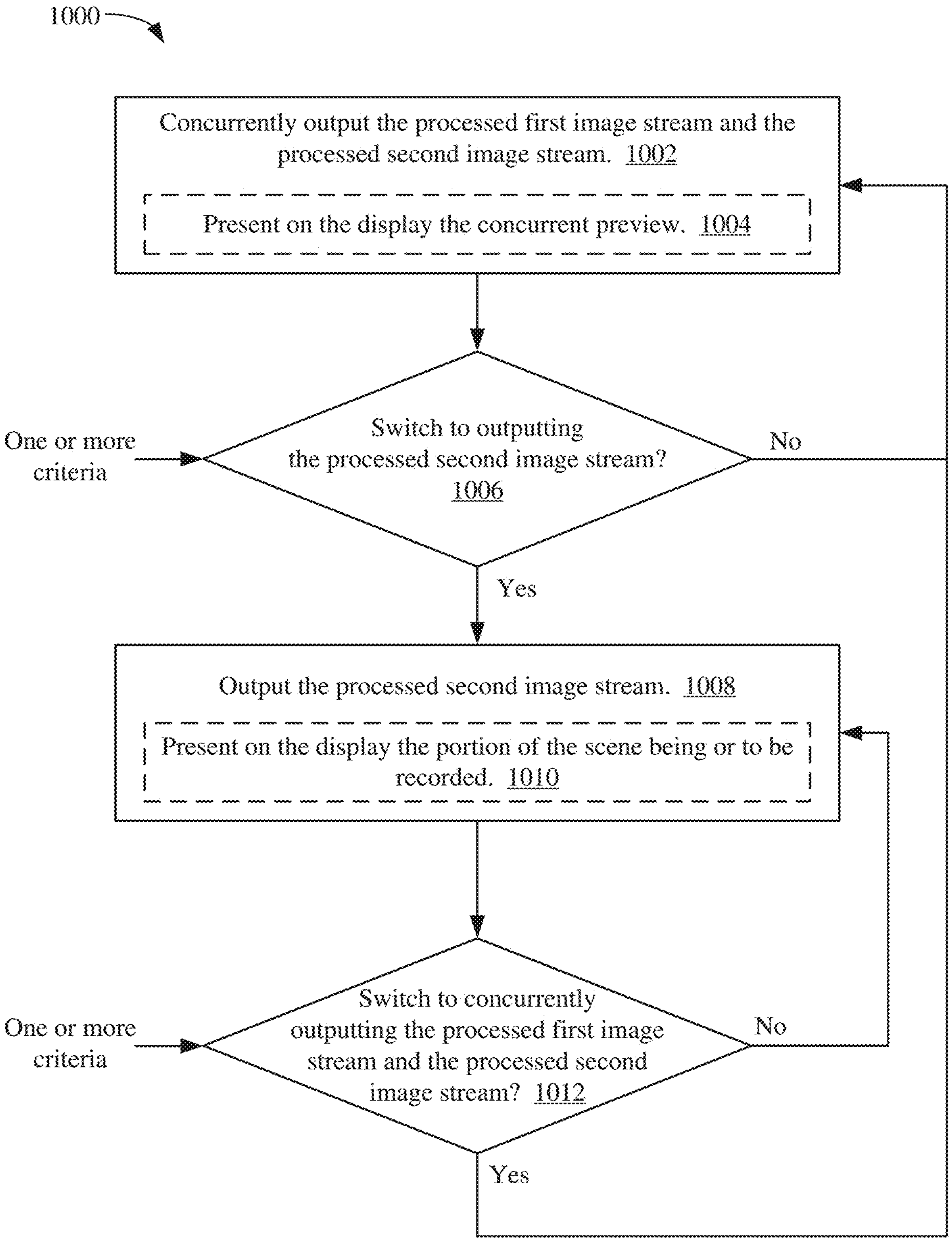
FIG. 10 is an illustrative flow chart depicting an example operation for switching between a concurrent preview of a scene and a preview of the scene being or to be recorded.

FIG. 10 is an illustrative flow chart depicting an example operation 1000 for switching between a concurrent preview and a preview of the scene being recorded. For example, the camera controller 212 (or device 200) may switch from concurrently outputting the processed first image stream (and the visual indication) and the processed second image stream (such as for displaying the concurrent preview on display 216) for preview to outputting only the processed second image stream (such as for displaying on display 216 what is being recorded) for preview. In some alternative implementations, the camera controller 212 (or device 200) may concurrently output the processed first image stream and the processed second image stream for preview while switching between the concurrent preview and a preview of what is being or to be recorded. The example operation 1000 of FIG. 10 is discussed with respect to FIG. 9B, but similar processes or steps in the example operation 1000 of FIG. 10 may be used to switch between previews illustrated in FIG. 9C or other example implementations.

Beginning at 1002, the device 200 may concurrently output the processed first image stream and the processed second image stream for a concurrent preview on display 216. For example, the camera controller 212 (such as by using the image signal processor 214) may concurrently output the processed first image stream and the processed second image stream. The display 216 may display the concurrent preview 902, including the zoom assist preview and a preview of what is being or to be recorded (1004). The device 200 may then determine from one or more criteria (such as receiving a user command from display 216 by the user tapping a zoom assist button or swiping the screen, determining movement in the scene or camera movement, and so on) if the device 200 (or camera controller 212) is to switch from concurrently outputting the processed first and second image streams to outputting only the processed second image stream for preview (1006). For example, the device 200 determines if the display 216 should switch (913) from the concurrent preview 902 to the preview 904 of what is being recorded. If no switch is to occur, the device 200 continues to concurrently output the processed first and second image streams (1002). For example, display 216 continues to present the concurrent preview 902 (1004).

If a switch is to occur (1006), the device 200 switches to outputting the processed second image stream (1008). In one example, the camera controller 212 (such as by using the image signal processor 214) may switch to outputting the processed second image stream. In another example, the camera controller 212 outputs both processed image streams for preview, and the device 200 determines to switch from outputting the processed first image stream for display 216 to present the concurrent preview to outputting the processed second image stream for display 216 to present. In this manner, the display 216 may optionally display the processed second image stream (1010), previewing what is being or to be recorded.

The device 200 may then determine from the one or more criteria (such as a change in the one or more criteria or an additional user request or input) if to switch from outputting the processed second image stream for preview to concurrently outputting the processed first and second image streams for preview (1012). For example, the device 200 determines if the display 216 should switch from presenting previews (913) from a preview 904 indicating the scene portion being recorded to a concurrent preview 902 in FIG. 9A. If no switch is to occur, the device 200 continues to output the processed second image stream (1008). For example, the display 216 continues to present the preview 904 indicating the scene portion being or to be recorded (1010). If a switch is to occur (1012), the device 200 switches to concurrently outputting the processed first and second image streams (1002). In this manner, the concurrent preview 902 may be presented by display 216. In some alternative implementations, the device 200 (such as by using the camera controller 212) may concurrently output both the processed first and second image streams, and the display 216 switches from presenting the preview of what is being recorded to presenting the concurrent preview.

In some example implementations, the display 216 may allow the user to interact with the presented preview (such as the user resizing and/or moving the visual indication shown on display 216). In some examples, if the display 216 is a touch-sensitive display, the device 200 may receive from the display 216 an indication that a user provided a pinch gesture to reduce the size of the visual indication and/or a spread gesture to increase the size of the visual indication. Additionally or alternatively, the user may provide a drag gesture to move the location of the visual indication. In some other examples, the user may provide commands via physical buttons (such as directional buttons, a zoom or scroll wheel, and so on) of a display 216 or device 200 or a microphone receiving audible commands. In some other examples, the device 200 may include or be coupled to a gyroscope and/or accelerometer receiving force commands.

Figure 11A:
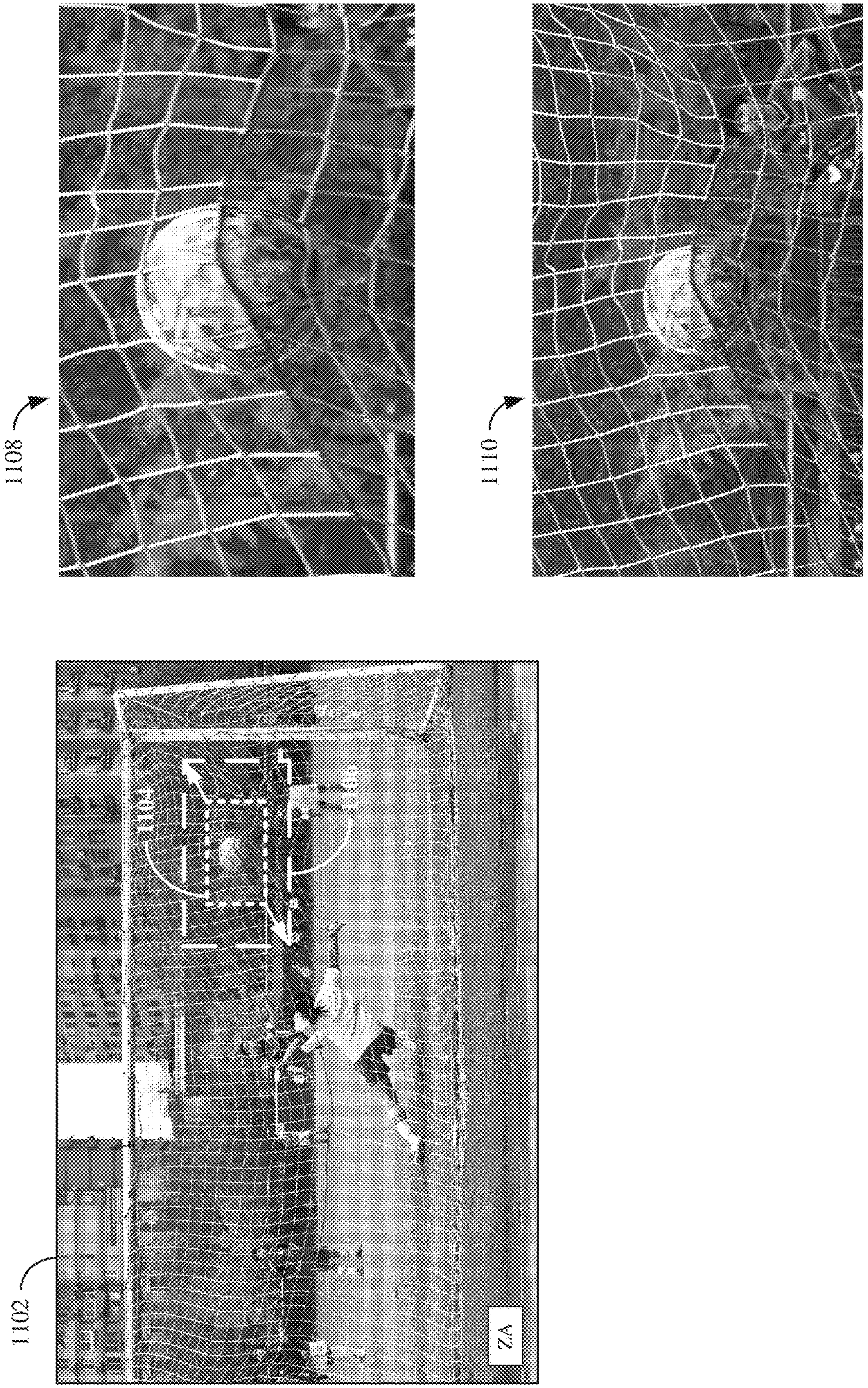
FIG. 11A illustrates an example display previewing the scene of FIG. 4A being captured and resizing a visual indication of the scene of FIG. 4A being or to be recorded.

FIG. 11A illustrates an example display 1102 providing a zoom assist preview wherein a first visual indication 1104 is resized to a second visual indication 1106 to indicate more of a portion of the scene being or to be recorded. Example display 1102 may be one implementation of the display 216 of or coupled to the device 200. Scene portion 1108 corresponds to the first visual indication 1104, and scene portion 1110 corresponds to the second visual indication 1106. In some examples, a user provides a spreading gesture for the first visual indication 1104 via the display 216 to switch from the first visual indication 1104 to the second visual indication 1106 and thus switches from the scene portion 1108 to the scene portion 1110 being or to be recorded.

Figure 11B:
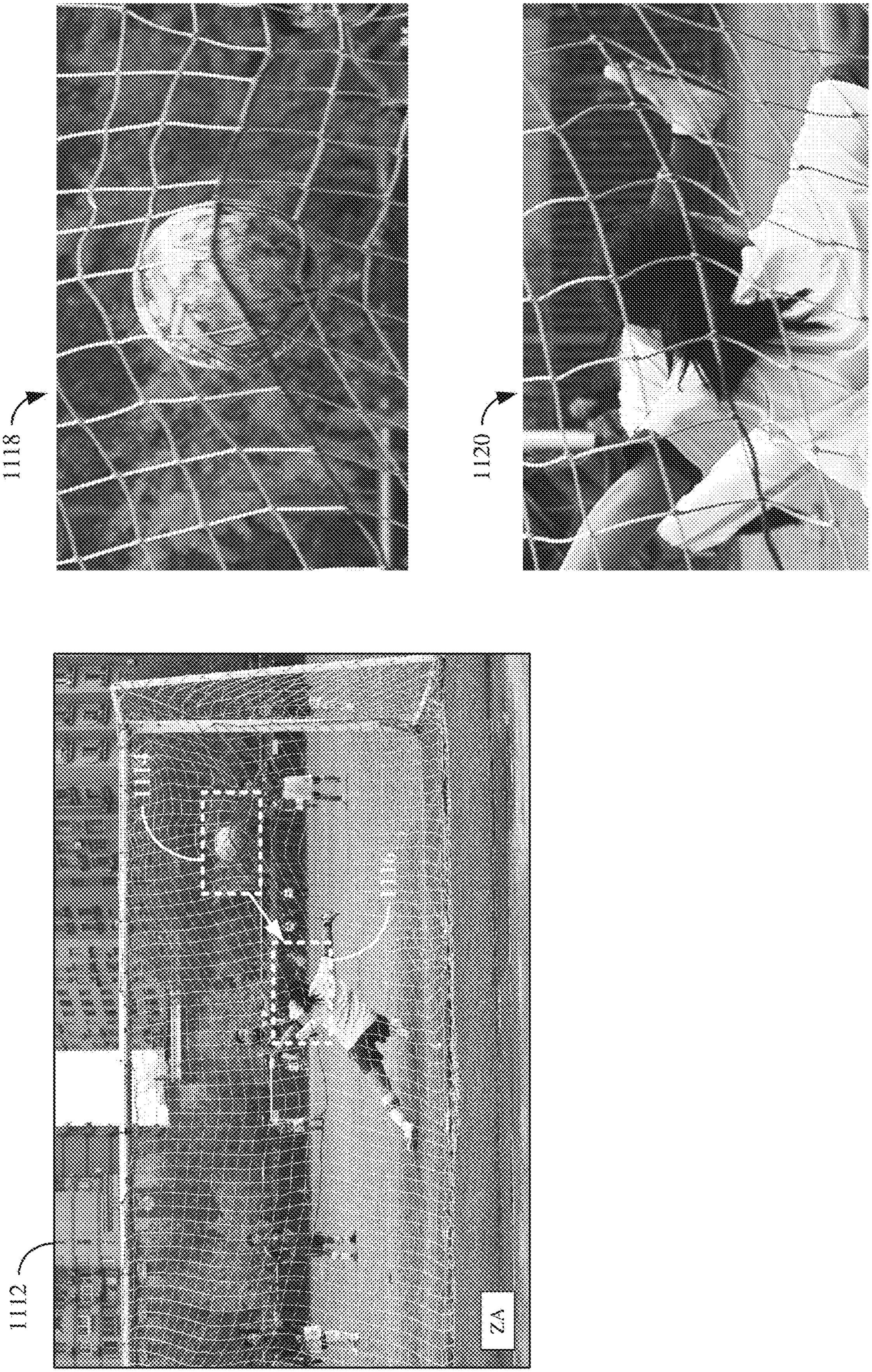
FIG. 11B illustrates an example display previewing the scene of FIG. 4A being captured and moving a visual indication of the scene of FIG. 4A being or to be recorded.

FIG. 11B illustrates an example display 1112 providing a zoom assist preview wherein a first visual indication 1114 is moved to a second visual indication 1116 to indicate a different portion of the scene being or to be recorded. Example display 1112 may be one implementation of the display 216 of or coupled to the device 200. Scene portion 1118 corresponds to the first visual indication 1114, and scene portion 1120 corresponds to the second visual indication 1116. In some examples, a user provides a drag gesture for the first visual indication 1114 via the display 216 to switch from the first visual indication 1114 to the second visual indication 1116 (such as moving the visual indication) and thus switch from the scene portion to the scene portion 1110 being or to be recorded.

Figure 12:
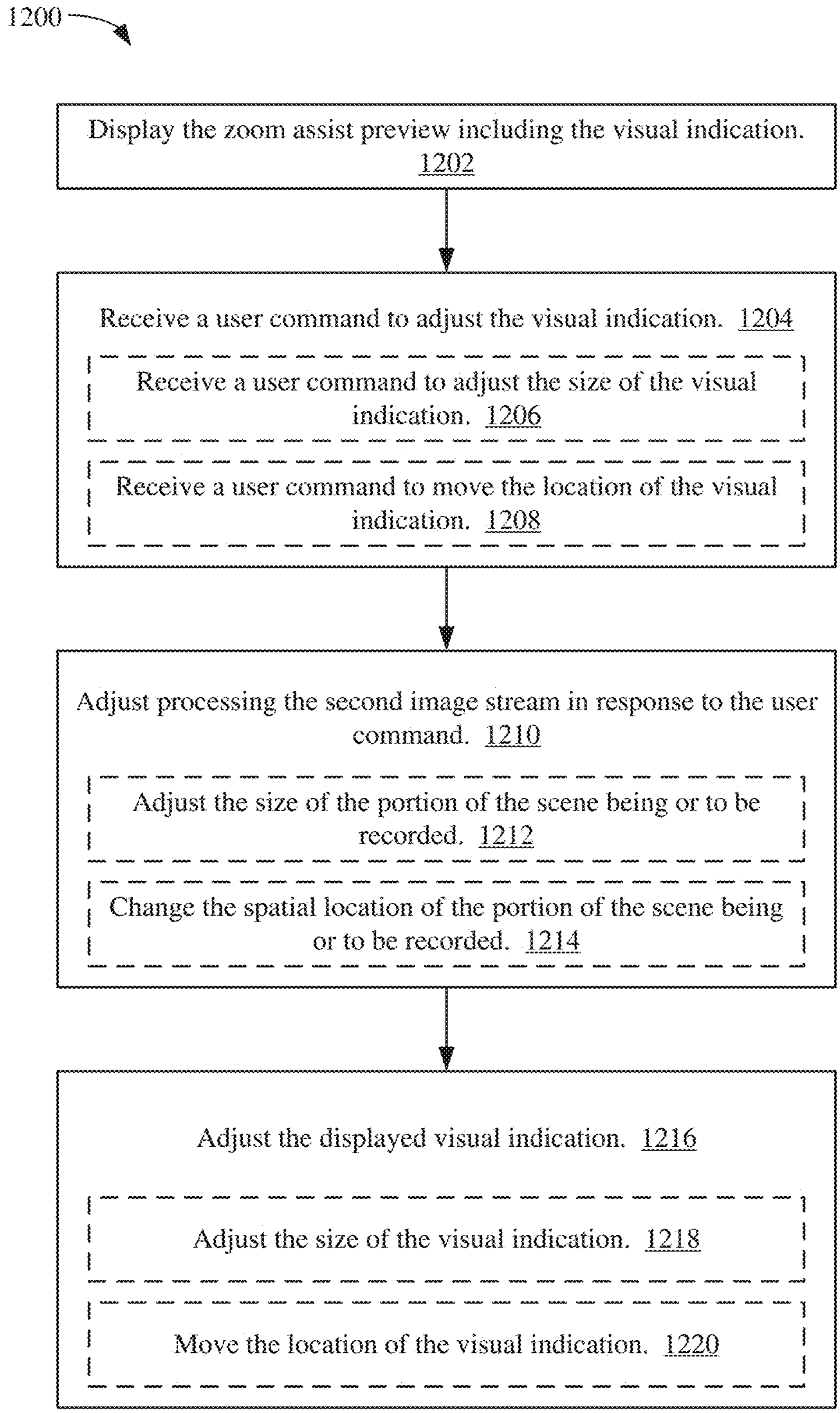
FIG. 12 is an illustrative flow chart depicting an example operation for adjusting the portion of the scene of FIG. 4A being or to be recorded based on a user adjusting a visual indication of the portion of the scene of FIG. 4A being or to be recorded.

FIG. 12 is an illustrative flow chart depicting an example operation 1200 for adjusting a portion of the scene being or to be recorded based on a user input to adjust a visual indication. The example operation 1200 of FIG. 12 is discussed with respect to FIGS. 11A and 11B, but similar processes or steps in the example operation 1200 of FIG. 12 may be used to resize what is to be or being recorded for other example implementations. For example, while a zoom assist preview is described, adjusting the visual indication may occur in a concurrent preview or other previews.

Beginning at 1202, the display 216 may display the zoom assist preview (or alternatively, a concurrent preview) including a visual indication of the portion of the scene being or to be recorded. While the display 216 presents the zoom assist preview, the device 200 may receive a user input or request to adjust the visual indication (1204), such as from display 216 providing user commands from a user interaction with the display. For example, the device 200 may optionally receive a user command to adjust the size of the visual indication 1104 in FIG. 11A (1206). Additionally or alternatively, the device 200 may optionally receive a user command to move the location of the visual indication (1208). By requesting the visual indication be adjusted (such as through interacting with the display 216), a user indicates that the device 200 is to record a different portion of the scene than currently indicated by the visual indication in the zoom assist preview.

In response to the user command, the device 200 may adjust processing the second image stream (1210). In adjusting processing of the second image stream (1210), the device 200 may optionally adjust the size of the portion of the scene being recorded or to be recorded in the second image stream (1212). For example, when the scene portion 1108 (FIG. 11A) is output for recording, the device 200 adjusts processing the second image stream so that the scene portion 1110 is output for recording if the user changes the first visual indication 1104 to the second visual indication 1106. Additionally or alternatively, the device 200 may optionally change the spatial location of the portion of the scene being or to be recorded (1214). For example, where scene portion 1118 (FIG. 11B) is output for recording, device 200 adjusts processing the second image stream so that scene portion 1120 is output for recording if the user moves the visual indication 1114 to the location of visual indication 1116 in preview 1112.

In some example implementations, the device 200 may adjust what portion of the scene the second camera 204 captures for recording, or send a command to the second camera 204 to adjust what is being captured, before applying one or more filters to the captured second image stream. In one example, the camera controller 212 may send a command to second camera 204 to change an optical zoom level of second camera 204. In another example, the camera controller 212 may send a command to second camera 204 to adjust the pan and/or tilt of second camera 204 (such as for a security camera).

In some other example implementations, the device 200 may crop the captured second image stream from the second camera 204 (or the processed second image stream after applying one or more filters). In this manner, the device 200 may adjust cropping the second image stream so that only the portion of the scene associated with the adjusted visual indication is output for recording. For example, the second camera 204 captures more of the scene than what is recorded (such as a digital zoom may be used for the second image stream to show what is to be or being recorded). If the device 200 is to record a different portion of the scene currently being recorded in the second image stream, the second camera 204 might capture the same scene, and the device 200 (such as camera controller 212) may adjust the portion of the second image stream being recorded without adjusting the second camera 204.

Referring back to FIG. 12, the device 200 may adjust generating the displayed visual indication in response to adjusting processing the second image stream and/or in response to the user input to adjust the visual indication (1216). In some example implementations, the device 200 may optionally adjust the size of the visual indication to be displayed in the preview (1218). Additionally or alternatively, the device 200 may optionally move the visual indication to the new location to be displayed in the preview (1220).

In addition or alternative to a user requesting a change to the size and/or location of the visual indication (such as by user gestures on a touch-sensitive display 216 or other user inputs), the device 200 may automatically adjust generating the size and/or location of the visual indication (and thus the portion of the scene being or to be recorded) in response to one or more criteria. In one example, if the device 200 tracks an object for recording (such as a face, person, soccer ball, and so on), and the camera is unable to focus on the object (such as that the object is blurry in the recording), the device 200 may record more of the scene including the object (increasing the size of the visual indication and thus "zooming out" from the object) in order to adjust the focus to make the object clear in the recording. For example, the device 200 may send a command to the camera to optically zoom out so that more of the scene is captured. In another example, if the brightness of the scene is reduced, the device 200 may command a camera to capture more of the scene for recording (which increases the size of the visual indication) to attempt to capture more ambient light. In a further example, if the device 200 is tracking a moving object, the device adjusts the portion of the scene being or to be recorded (thus adjusting the location of the visual indication in the preview) to attempt to track the object.

In some example implementations, the second camera 204 does not capture as much of the scene as the first camera 202, or the second camera 204 captures a different portion of the scene than the first camera 202. For example, some dual cameras have a first camera with a wide field of view and a second camera with a narrower field of view (such as a telephoto camera). In this manner, a second camera may be unable to capture all of the scene in the first image stream. If a user of the device 200 attempts to adjust the visual indication (such as move or resize the visual indication via display 216) in a zoom assist preview to an area of the scene that is not captured by the second camera 204, the device 200 may automatically switch to using the first image stream (provided from first camera 202) in recording the new portion of the scene. The switch from using the second image stream to the first image stream for recording may be seamless and invisible to the user. For example, the camera controller 212 may seamlessly switch from outputting at least a portion of the processed second image stream for recording to outputting at least a portion of the processed first image stream for recording. Alternatively, the device 200 may notify the user (such as audible or visual notifications) that the stream used for recording has changed. In some other example implementations, both image streams may be recorded, and the device 200 may stitch portions of the two image streams together to generate a processed image stream corresponding to the portion of the scene indicated by the visual indication.

Figure 13A:
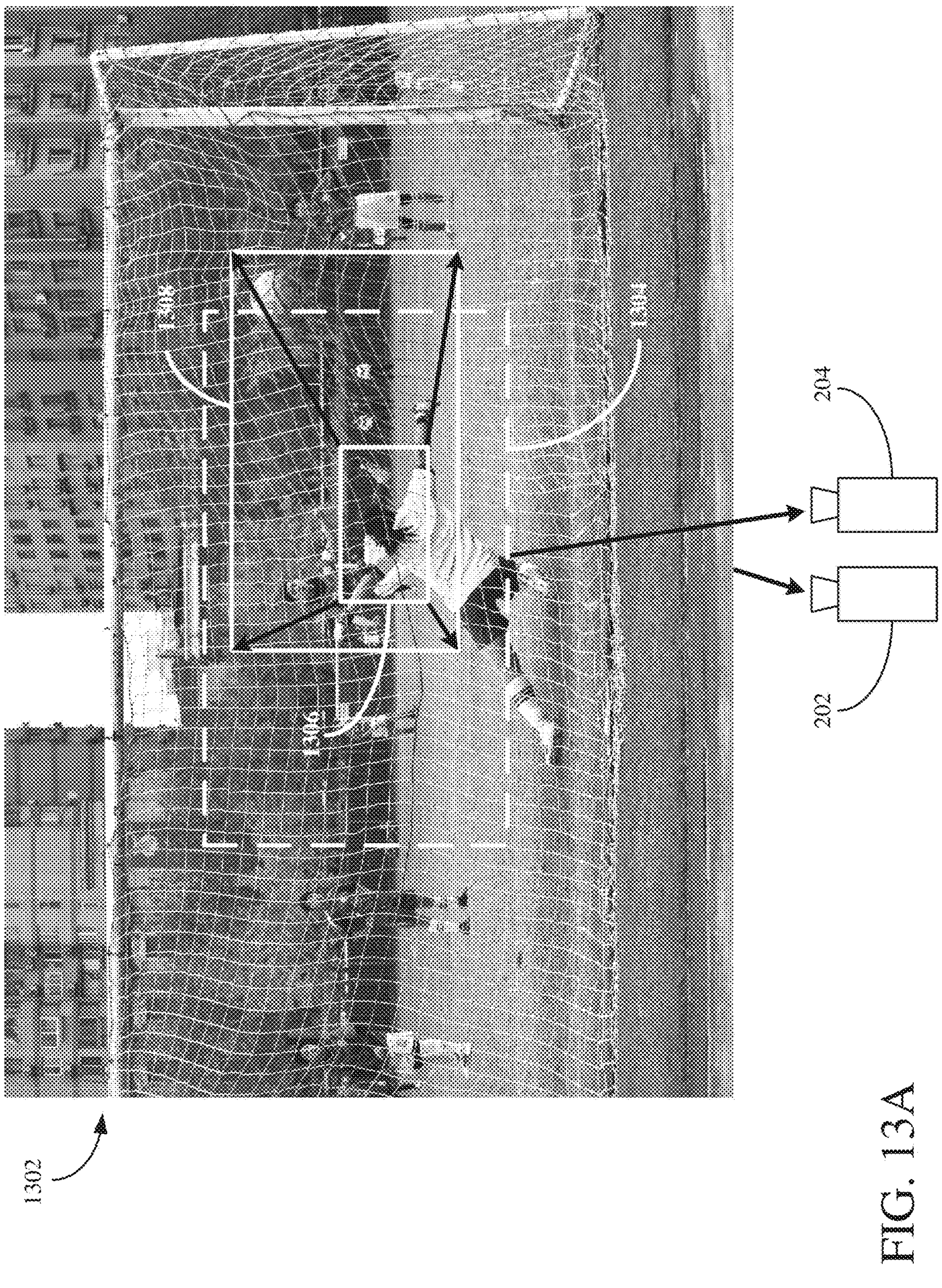
FIG. 13A illustrates an example scene being captured by a first camera and an example portion of the scene captured or able to be captured by a second camera.

FIG. 13A illustrates an example scene 1302 being captured by the first camera 202 and an example portion 1304 of the scene captured or able to be captured by the second camera 204. As shown, the scene portion 1304 captured by the second camera 204 is less than the scene 1302 captured by the first camera 202. In the illustrated example, the scene portion 1306 may be originally recorded or to be recorded. If the scene portion to be recorded is adjusted to be the scene portion 1308, the second camera 204 may be unable to capture the scene portion for recording. For example, a user may gesture on display 216 to adjust the visual indication in a zoom assist preview to change from recording the scene portion 1306 to recording the scene portion 1308, which is not captured in its entirety by the second camera 204. The device 200 may switch from using the second image stream for recording to using the first image stream for recording so that all of the intended portion of the scene is recorded.

Figure 13B:
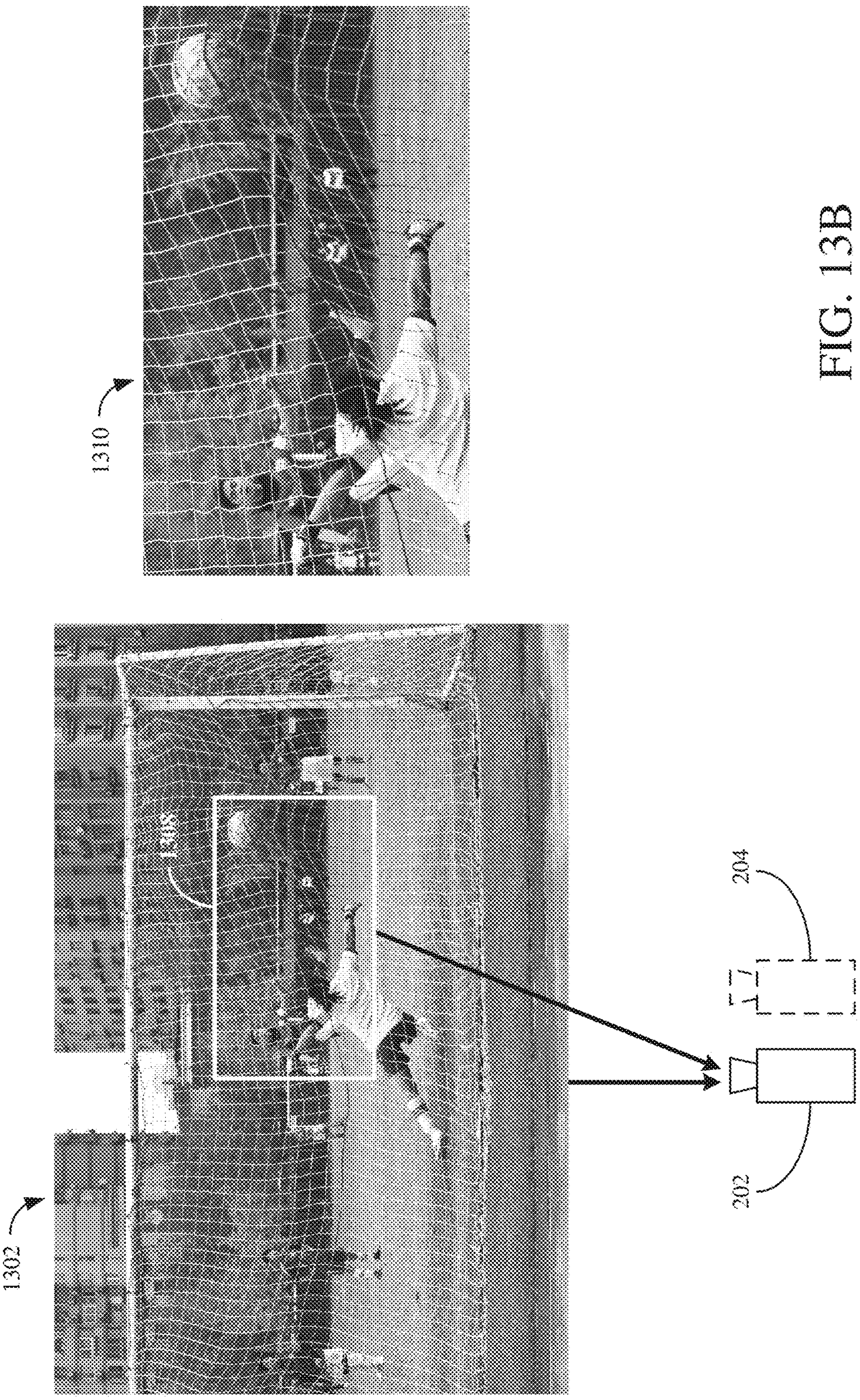
FIG. 13B illustrates the example scene in FIG. 13A and the portion of the scene of FIG. 13A being or to be recorded.

FIG. 13B illustrates the example scene 1302 in FIG. 13A captured by the first camera 202 and the scene portion 1308 being or to be recorded, wherein the first image stream (provided from the first camera 202) includes the scene portion 1308 (corresponding to the image 1310) that is recorded or to be recorded. In this manner, the second image stream (provided from the second camera 204) might not be used for recording the scene portion 1308.

Figure 14:
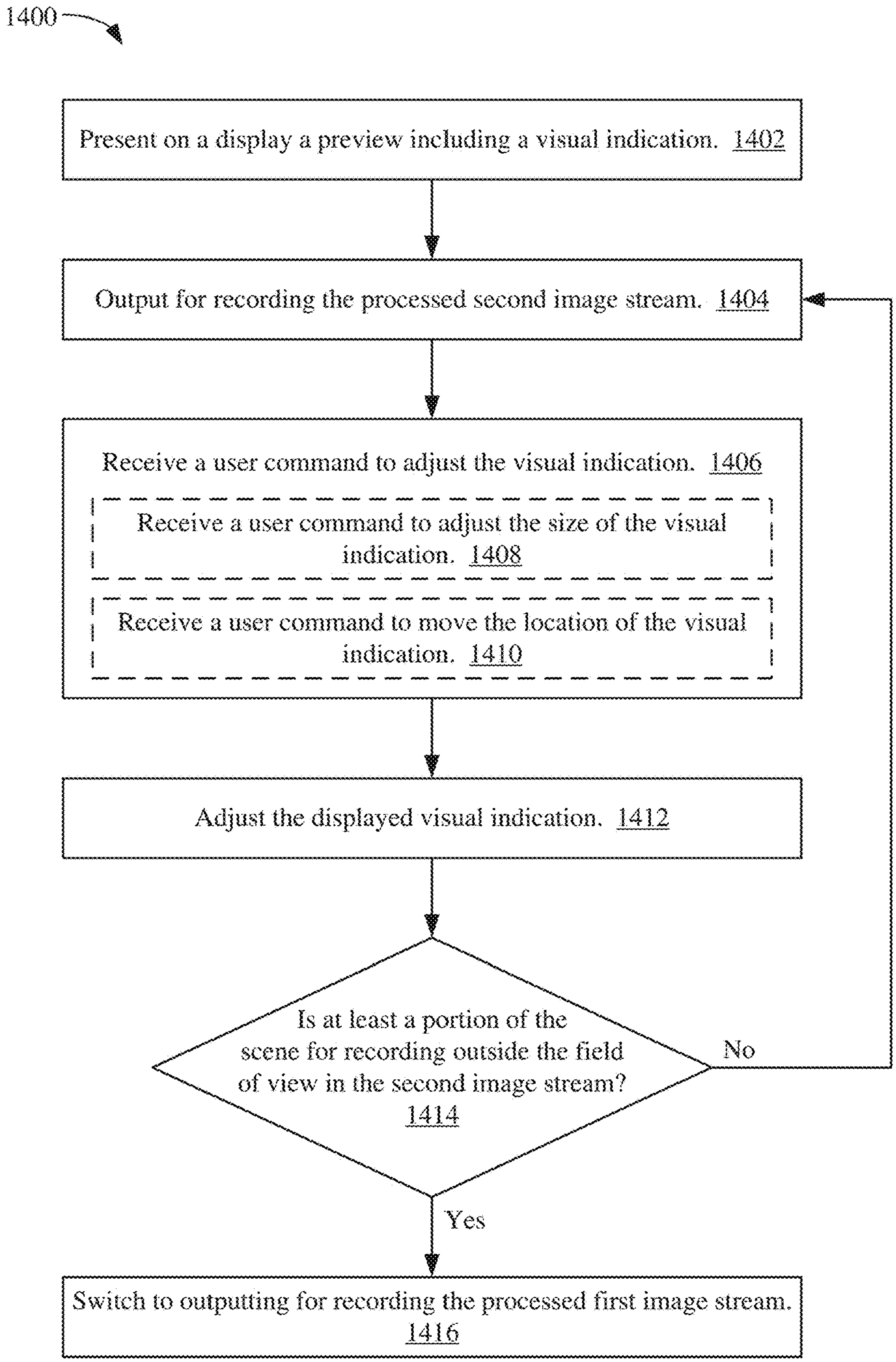
FIG. 14 is an illustrative flow chart depicting an example operation for switching between a first image stream and a second image stream.

FIG. 14 is an illustrative flow chart depicting an example operation 1400 for switching between a processed first image stream and a processed second image stream for recording a portion of the scene. Beginning at 1402, the display 216 may present a preview including a visual indication (such as a zoom assist preview or a concurrent preview). With the visual indication indicating the scene portion being or to be recorded being displayed on display 216, the device 200 (such as by using the camera controller 212) may output for recording the processed second image stream (1404). The device 200 may then receive a user command to adjust the visual indication (1406). For example, the device 200 may receive from display 216 a user command provided by the user through interacting with the display 216. In some example implementations, the device 200 may receive a user command to adjust the size of the visual indication (1408). Additionally or alternatively, the device 200 may receive a user command to move the location of the visual indication for the preview (1410).

With the device 200 to adjust the portion of the scene being recorded, the device 200 may adjust the visual indication so that the visual indication corresponds to the adjusted portion of the scene being recorded (1412). In response to the user command, the device 200 may determine if at least a portion of the scene for recording is outside the field of view in the second image stream (1414). For example, the device 200 determines if the scene portion 1304 (FIG. 13A) captured by the second camera 204 does not include all of the scene 1308 for recording. If the second image stream includes all of the scene 1308 for recording, the device 200 continues to output for recording the processed second image stream (1404). For example, the camera controller 212 adjusts the portion of the second image stream that is for recording and continues to generate and output the processed second image stream for recording.

If the second image stream does not include all of the scene for recording (such as second camera 204 not capturing all of the scene portion 1308 in FIG. 13A), the device 200 may switch from outputting for recording the processed second image stream to outputting for recording the processed first image stream (1416). For example, the camera controller 212 may switch from outputting a portion of the processed second image stream to outputting a portion of the processed first image stream corresponding to the scene portion 1308 in FIG. 13B. In some alternative implementations, the camera controller 212 may concurrently output both the processed first image stream and the processed second image stream. In this manner, the device 200 may determine to switch from using the processed second image stream for recording to using the processed first image stream for recording the portion of the scene.

In addition or alternative to a user requesting a change to the size and/or location of the visual indication (such as by user gestures on the display 216 or other user inputs), the device 200 may automatically switch from using the processed second image stream to using the processed first image stream for recording in response to one or more criteria of the scene, device 200, and/or other components. In some example implementations, a change in brightness may cause the device 200 to switch image streams for recording. For example, a dual camera may include a color camera and a black and white camera, wherein the black and white camera has better fidelity in low light situations than the color camera. In this manner, the device 200 may determine to switch from using the color camera's image stream to using the black and white camera's image stream for recording if the brightness of the scene falls below a threshold.

In some other example implementations, one or more of the cameras (such as first camera 202 and second camera 204) may be moved such that the object being tracked may fall outside the portion of the scene being captured by one of the cameras. For example, if the first camera 202 includes a wide view and the second camera 204 is a telephoto camera, a global motion in the first image stream and/or the second image stream may cause the object to go out of or about to go out of the field of view of the second camera 204. As a result, the device 200 may switch image streams from the second camera 204 to the first camera 202 for recording in order to keep tracking the object. Similarly, the object being tracked may move (a local motion) so that the second image stream might not include the object. The device 200 may switch from using the second image stream (which may be captured by a telephoto camera) to using the first image stream (which may be captured by a wider field of view camera).

Figure 15:
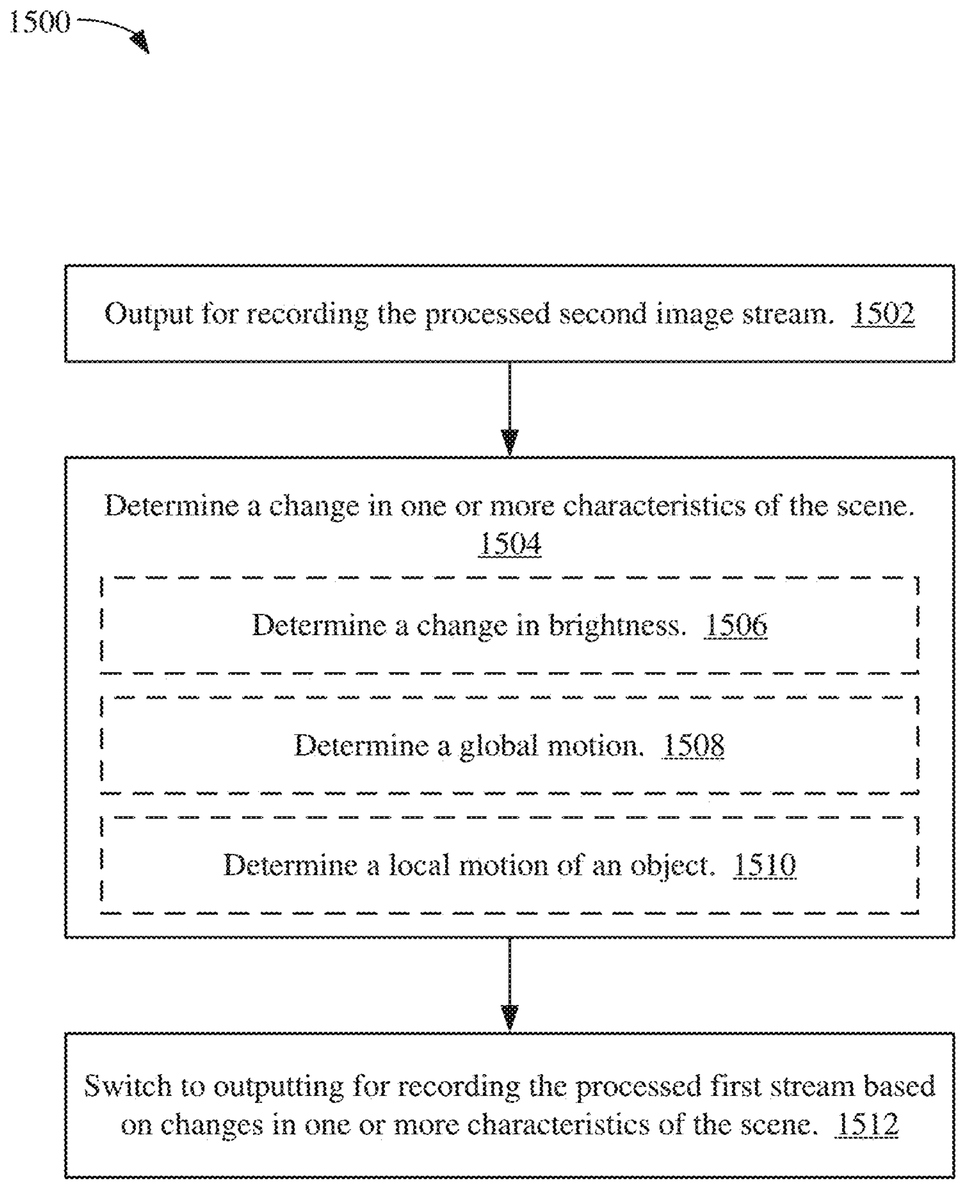
FIG. 15 is an illustrative flow chart depicting an example operation for switching from a processed second image stream to a processed first image stream.

FIG. 15 is an illustrative flow chart depicting an example operation 1500 for switching from a processed second image stream to a processed first image stream for recording based on one or more criteria. Beginning at 1502, the device 200 may output for recording the processed second image stream. The device 200 may then determine a change in one or more characteristics of the scene (1504). In one example, the device 200 may optionally determine a change in brightness or luminance in at least one of the image streams (1506). For example, the ambient light intensity may be determined to fall below a threshold for the current processed image stream being used for recording. In another example, the device 200 may optionally determine a global motion in at least one of the image streams (1508). For example, the second camera 204 may be moved so that the first camera 202 is to be used to capture the portion of the scene for recording. In a further example, the device 200 may optionally determine a local motion of an object (1510). For example, the object being tracked by device 200 may move out of the field of view of the second camera 204 so that the processed first image stream is to be used for recording.

Based on changes to one or more characteristics of the scene, the device 200 switches from outputting for recording the processed second image stream to outputting for recording the processed first image stream (1512). In one example, the camera controller 212 may switch from outputting the processed second image stream for recording to outputting the processed first image stream for recording, where a portion of the processed first and/or second image streams may be stored for later use. In another example, the camera controller 212 may output both processed image streams, and the device 200 may determine to switch from using the outputted processed second image stream to using the outputted processed first image stream for recording.

In another example implementation of the device 200 automatically switching between processed image streams for recording, an alien object may encroach on the portion of the scene being or to be recorded. For example, in recording a child's soccer game, a person sitting in front of the father may suddenly enter the portion of the scene being or to be recorded (such as standing up, moving his or her head, and so on) so that the device 200 is not recording (or outputting for recording) the intended portion of the scene. If the object blocks or obstructs a small portion of the scene being recorded, the recording using the same image stream may continue with limited interruptions. However, if the object blocks or obstructs a large portion of the scene, the device 200 may determine to attempt using a different image stream for recording. In some example implementations, the device 200 may switch to another processed image stream to attempt to capture the intended portion of the scene (such as if another camera has a different vantage of the portion of the scene not obstructed by the alien object or another camera has a wider field of view so as to "zoom out" to capture the scene). For example, the device 200 may determine that a percentage of the portion of the scene is obstructed, may determine that an alien object is within a distance from the center of the scene being recorded, and so on.

Figure 16:
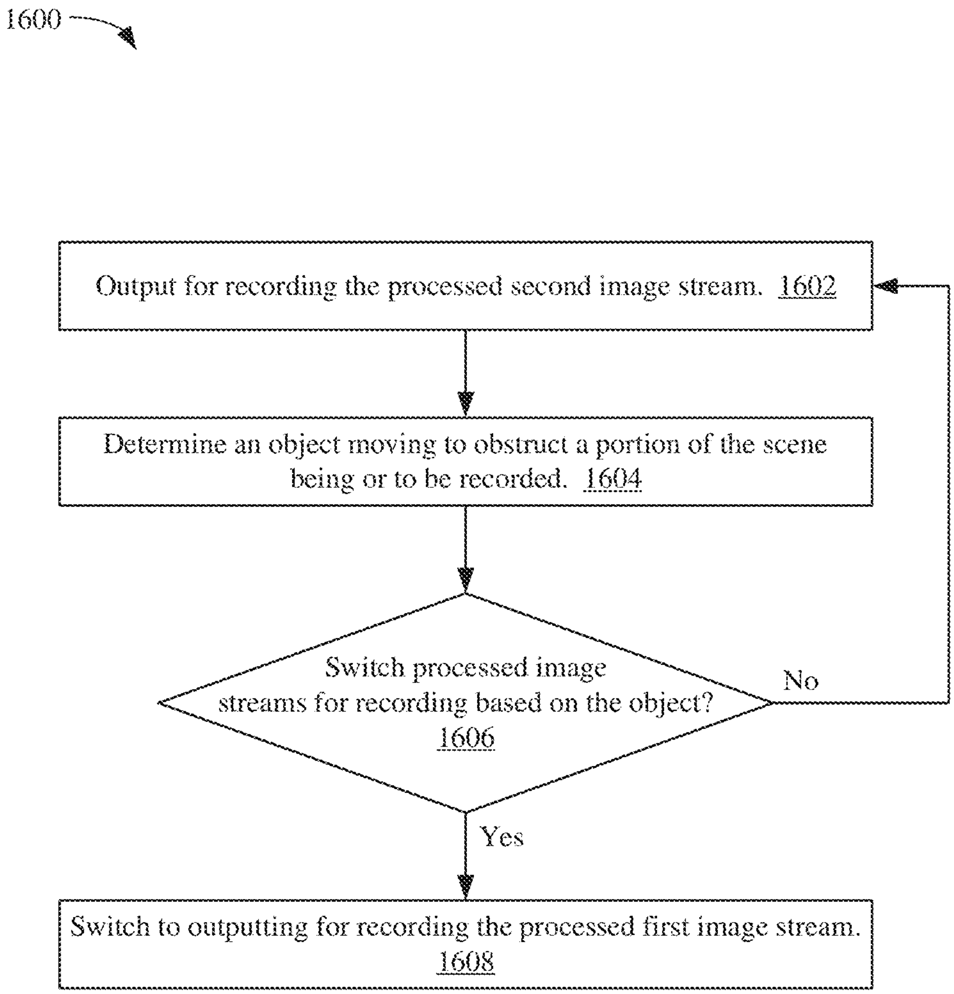
FIG. 16 is an illustrative flow chart depicting another example operation for switching from a processed second image stream to a processed first image stream.

FIG. 16 is an illustrative flow chart depicting an example operation 1600 for switching from a processed second image stream to a processed first image stream for recording based on an object obstructing a portion of the scene being or to be recorded. Beginning at 1602, the device 200 may output for recording the processed second image stream. In one example, the camera controller 212 may output the processed second image stream for recording. In another example, the camera controller 212 may output multiple processed image streams, and the device 200 may use the processed second image stream for recording the portion of the scene.

With the processed second image stream being used for recording the portion of the scene, the device 200 may determine that an object moves to obstruct a portion of the scene being or to be recorded (1604). The device 200 may then determine whether to switch from the processed second image stream to the processed first image stream based on the object (1606). In one example, the device 200 may determine if the object obstructs more than a percentage of the portion of the scene being or to be recorded. In another example, the device 200 may determine if the object is within a defined distance from obstructing the center of the portion of the scene being or to be recorded. In a further example, the device 200 may predict from the object's movement if the object is to obstruct a percentage of the portion of the scene for recording or a center of the portion of the scene for recording. If the device 200 determines to not switch processed image streams for recording the portion of the scene, the device 200 continues to output the processed second image stream for recording the portion of the scene (1602). If the device 200 determines to switch processed image streams for recording the portion of the scene, the device 200 switches to outputting the processed first image stream for recording the portion of the scene (1608).

Alternatively, if the camera controller 212 outputs both the processed first image stream and the processed second image stream, the device 200 may switch from using the processed second image stream to using the processed first image stream for recording the portion of the scene. In some example implementations, the device 200 may continue to track the obstructing object. If the obstructing object vacates the portion of the scene being or to be recorded, the device 200 may determine to switch processed image streams for recording. Alternatively, the device 200 may continue to use the current processed image stream for recording until another criterion causes the device to determine to switch using processed image streams for recording.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 208 in the example device 200 of FIG. 2) comprising instructions 210 that, when executed by the processor 206 (or the image signal processor 214), cause device 200 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 206 or the image signal processor 214 in the example device 200 of FIGS. 2A and 2B. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the example operations illustrated in FIGS. 6, 8, 10, 12, and 14-16, if performed by the device, camera controller, processor, or image signal processor, may be performed in any order and at any frequency (such as for every image capture, a periodic interval of image captures in a processed image stream, a predefined time period, when user gestures are received, and so on). Furthermore, although elements may be described or claimed in the singular, the plural is contemplated unless limitation to the singular is explicitly stated. For example, while two processed image streams are described, one processed image stream or three or more processed image streams may be used in performing aspects of the present disclosure. Accordingly, the disclosure is not limited to the illustrated examples and any means for performing the functionality described herein are included in aspects of the disclosure.

What is claimed is:

1. A device having a multicamera system, the device configured to process and display image data, the device comprising:
- a first camera, having a first field of view (FOV), configured to capture a first image stream associated with a first preview of a scene;
- a second camera, having a second FOV that is different than the first FOV, configured to capture a second image stream associated with a second preview of a first portion of the scene, where the second image stream is different from the first image stream, and
- at least one processor in communication with the first camera and the second camera, the at least one processor being configured to output previews associated with the first image stream and the second image stream; and
- a touch-sensitive display configured to:
  - concurrently preview the first image stream associated with the first FOV and the second image stream associated with the second FOV;
  - display, during the concurrent preview of the first image stream and the second image stream, a first visual indication indicative of the first portion of the scene associated with the second image stream;
  - receive a first user input to change a zoom level; and
  - switch to output for preview, based on the first user input to change the zoom level,
- the first image stream without the second image stream.

2. The device of claim 1, wherein the preview does not include the first visual indication.

3. The device of claim 2, wherein the at least one processor is further configured to:
- receive a subsequent user input to change the zoom level;
- switch to output for concurrent preview, based on the subsequent user input to change the zoom level after the first user input to change the zoom level, the first image stream and the second image stream; and
- display, during the concurrent preview of the first image stream and the second image stream, a second visual indication, the second visual indication being different from the first visual indication.

4. The device of claim 1, wherein the first user input is a gesture.

5. The device of claim 1, wherein the first user input is a screen swipe.

6. The device of claim 1, wherein the at least one processor is further configured to:
- receive a subsequent user input to change the zoom level;
- switch to output for concurrent preview, based on the subsequent user input to change the zoom level after the first user input to change the zoom level, the first image stream and the second image stream; and
- display, during the concurrent preview of the first image stream and the second image stream, a second visual indication, the second visual indication being different from the first visual indication.

7. The device of claim 1, wherein the at least one processor is further configured to:
- receive, before the first user input, a previous user input indicative of recording only the second image stream; and
- process, for recording, image data of the second image stream.

8. A device having a multicamera system, the device configured to process and display image data, the device comprising:
- a first camera, having a first field of view (FOV), configured to capture a first image stream associated with a first preview of a scene;
- a second camera, having a second FOV that is different than the first FOV, configured to capture a second image stream associated with a second preview of a first portion of the scene, where the second image stream is different from the first image stream, and
- at least one processor in communication with the first camera and the second camera, the at least one processor being configured to output previews associated with the first image stream and the second image stream; and
- wherein the at least one processor in communication with a touch-sensitive display is configured to:
  - perform a first concurrent preview operation including concurrently previewing the first image stream associated with the first FOV and the second image stream associated with the second FOV;
  - cause the touch-sensitive display to display, during the first concurrent preview operation of the first image stream and the second image stream, a first visual indication indicative of the first portion of the scene associated with the second image stream;

receive a first user input to change a zoom level; and perform a first switching operation, based on the first user input to change the zoom level, to switch from concurrently previewing the first image stream and the second image stream to previewing the first image stream without the second image stream.

9. The device of claim 8, wherein previewing the first image stream without the second image stream does not include the first visual indication.

10. The device of claim 9, wherein the at least one processor is further configured to:

receive a subsequent user input to change the zoom level;

perform a second switching operation, based on the subsequent user input to change the zoom level after the first user input to change the zoom level, to switch from previewing the first image stream without the second image stream to concurrently previewing the first image stream and the second image stream during a second concurrent preview operation; and cause the touch-sensitive display to display, during the second concurrent preview operation of the first image stream and the second image stream, a second visual indication.

11. The device of claim 8, wherein the first user input is a gesture.

12. The device of claim 8, wherein the first user input is a screen swipe.

13. The device of claim 8, wherein the first user input is a tap.

14. The device of claim 8, wherein the at least one processor is further configured to:

receive a subsequent user input to change the zoom level;

perform a second switching operation, based on the subsequent user input to change the zoom level after the first user input to change the zoom level, to switch from previewing the first image stream without the second image stream to concurrently previewing the first image stream and the second image stream during a second concurrent preview operation; and cause the touch-sensitive display to display, during the second concurrent preview operation of the first image stream and the second image stream, a second visual indication.

15. The device of claim 8, wherein the at least one processor is further configured to:

receive, before the first user input, a previous user input indicative of recording only the second image stream; and process, for recording, image data of the second image stream.

* * * * *